United States Patent
Gou et al.

(10) Patent No.: US 12,493,786 B2
(45) Date of Patent: Dec. 9, 2025

(54) VISUAL ANALYTICS SYSTEM TO ASSESS, UNDERSTAND, AND IMPROVE DEEP NEURAL NETWORKS

(71) Applicant: Robert Bosch GmbH, Stuttgart (DE)

(72) Inventors: Liang Gou, San Jose, CA (US); Lincan Zou, San Jose, CA (US); Wenbin He, Sunnyvale, CA (US); Liu Ren, Saratoga, CA (US)

(73) Assignee: Robert Bosch GmbH, Stuttgart (DE)

( * ) Notice: Subject to any disclaimer, the term of this patent is extended or adjusted under 35 U.S.C. 154(b) by 1038 days.

(21) Appl. No.: 17/186,392

(22) Filed: Feb. 26, 2021

(65) Prior Publication Data

US 2022/0277192 A1    Sep. 1, 2022

(51) Int. Cl.
*G06N 3/08*   (2023.01)
*G06N 3/04*   (2023.01)

(52) U.S. Cl.
CPC .................. *G06N 3/08* (2013.01); *G06N 3/04* (2013.01)

(58) Field of Classification Search
CPC .................................. G06N 3/08; G06N 3/04
See application file for complete search history.

(56) References Cited

U.S. PATENT DOCUMENTS

| | | | |
|---|---|---|---|
| 9,092,458 B1 * | 7/2015 | Perona | G06F 16/583 |
| 10,824,942 B1 * | 11/2020 | Bhotika | G06N 3/08 |
| 11,100,400 B2 * | 8/2021 | Fang | G06N 3/084 |
| 2011/0184950 A1 * | 7/2011 | Skaff | G06N 20/00 |
| | | | 715/810 |
| 2019/0034557 A1 * | 1/2019 | Alsallakh | G06N 3/045 |
| 2019/0065848 A1 * | 2/2019 | Borrel | G06N 20/00 |
| 2021/0012201 A1 * | 1/2021 | Ayush | G06N 3/08 |
| 2021/0133861 A1 * | 5/2021 | Kumar | G06Q 30/0643 |
| 2022/0058431 A1 * | 2/2022 | Jang | G06N 3/045 |
| 2022/0121744 A1 * | 4/2022 | Mishra | G06N 3/044 |

(Continued)

OTHER PUBLICATIONS

Vladimir Haltakov, (2015). Semantic segmentation-based traffic light detection at day and at night. (Year: 2015).*

(Continued)

*Primary Examiner* — Li B. Zhen
*Assistant Examiner* — Sadik A Alshahari
(74) *Attorney, Agent, or Firm* — Maginot, Moore & Beck LLP

(57) ABSTRACT

A visual analytics workflow and system are disclosed for assessing, understanding, and improving deep neural networks. The visual analytics workflow advantageously enables interpretation and improvement of the performance of a neural network model, for example an image-based objection detection and classification model, with minimal human-in-the-loop interaction. A data representation component extracts semantic features of input image data, such as colors, brightness, background, rotation, etc. of the images or objects in the images. The input image data are passed through the neural network to obtain prediction results, such as object detection and classification results. An interactive visualization component transforms the prediction results and semantic features into interactive and human-friendly visualizations, in which graphical elements encoding the prediction results are visually arranged depending on the extracted semantic features of input image data.

15 Claims, 12 Drawing Sheets

(56) References Cited

U.S. PATENT DOCUMENTS

| | | | |
|---|---|---|---|
| 2022/0230020 A1* | 7/2022 | Saeugling | G06N 3/08 |
| 2022/0300124 A1* | 9/2022 | Ahas | G06F 16/54 |

OTHER PUBLICATIONS

Jaegul Choo, (Jul. 2018). Visual Analytics for Explainable Deep Learning. (Year: 2018).*

Junpeng Wang, (Sep. 2018). DQNViz: A Visual Analytics Approach to Understand Deep Q-Networks. (Year: 2018).*

Junpeng Wang, (Jun. 2018). GANViz: A Visual Analytics Approach to Understand the Adversarial Game. (Year: 2018).*

Giulia Vilone, (Oct. 2020). Explainable Artificial Intelligence: a Systematic Review. (Year: 2020).*

Xiaoyan Jiang, (Jan. 2019). An End-to-End Human Segmentation by Region Proposed Fully Convolutional Network. (Year: 2019).*

Qing Li, (Jan. 2020). Deep Hierarchical Semantic Segmentation Algorithm Based on Image Information Entropy. (Year: 2020).*

Molner, C., "Interpretable machine learning: A Guide for Making Black Box Models Explainable," 2019, https://christophm.github.io/interpretable-ml-book/ (348 pages).

Das, A. et al., "Opportunities and Challenges in Explainable Artificial Intelligence (XAI): A Survey," 2020, arXiv:2006.11371v2, https://arxiv.org/abs/2006.11371 (24 pages).

Simonyan, K. et al., "Deep Inside Convolutional Networks: Visualising Image Classification Models and Saliency Maps," 2013, arXiv: 312.6034v1, https://arxiv.org/abs/1312.6034v1 (8 pages).

Erhan, D. et al., "Understanding Representations Learned in Deep Architectures," 2010, http://www-labs.iro.umontreal.ca/~lisa/pointeurs/invariances_techreport.pdf (25 pages).

Bach, S. et al., "On Pixel-Wise Explanations for Non-Linear Classifier Decisions by Layer-Wise Relevance Propagation," Plos One, 2015, vol. 10, No. 7 (46 pages).

Ribeiro, M. T. et al., ""Why Should I Trust You?": Explaining the Predictions of Any Classifier", 2016, arXiv:1602.04938v3, https://arxiv.org/abs/1602.04938 (10).

Lundberg, S. M. et al., "A Unified Approach to Interpreting Model Predictions," 31st Conference on Neural Information Processing Systems (NIPS 2017), 2017 (10 pages).

Frosst, N. et al., "Distilling a Neural Network Into a Soft Decision Tree," 2017, arXiv:1711.09784v1, https://arxiv.org/abs/1711.09784 (8 pages).

Ming, Y. et al., "RuleMatrix: Visualizing and Understanding Classifiers with Rules," 2018, arXiv:1807.06228v1, https://arxiv.org/pdf/1807.06228.pdf (11 pages).

Kim, B. et al., "Interpretability Beyond Feature Attribution: Quantitative Testing with Concept Activation Vectors (TCAV)," 2018, arXiv:1711.11279v5, https://arxiv.org/pdf/1711.11279.pdf (18 pages).

Ming, Y. et al., "Interpretable and Steerable Sequence Learning via Prototypes," ACM International Conference on Knowledge Discovery and Data Mining (SIGKDD), 2019, arXiv:1907.09728v1, https://arxiv.org/pdf/1907.09728.pdf (11 pages).

Kingma, D. P. et al., "Auto-Encoding Variational Bayes," 2013, arXiv:1312.6114v1, https://arxiv.org/pdf/1312.6114v1.pdf (9 pages).

Ward, J. H., "Hierarchical Grouping to Optimize an Objective Function," Journal of the American Statistical Association, 1963, vol. 28, Iss. 301, 236-244 (9 pages).

Ross, B. C., "Mutual Information between Discrete and Continuous Data Sets," Plos One, 2014, vol. 9, Iss. 2 (5 pages).

Mui, C., "Driverless Cars: 90 Percent Done, 90 Percent Left To Go?," Forbes, Feb. 2018, retrieved from Internet: https://www.forbes.com/sites/chunkamui/2018/02/28/driverless-cars-90-percent-done-90-percent-left-to-go/?sh=2ffb234220a0 (6 pages).

Bau, D. et al., "Network Dissection: Quantifying Interpretability of Deep Visual Representations," 30th IEEE Conference on Computer Vision and Pattern Recognition, 2017, retrieved from Internet: https://arxiv.org/abs/1704.05796 (9 pages).

Behrendt, K. et al., Git Repo for Bosch Small Traffic Lights Dataset, 2020, retrieved from Internet: https://github.com/bosch-ros-pkg/bstld (5 pages).

Besold, T. R. et al., "Neural-Symbolic Learning and Reasoning: A Survey and Interpretation," Nov. 2017, retrieved from Internet: https://arxiv.org/pdf/1711.03902.pdf (58 pages).

Bilal, A. et al., "Do Convolutional Neural Networks Learn Class Hierarchy?," IEEE Transactions on Visualization and Computer Graphics, 2018, vol. 24, No. 1, retrieved from Internet: https://arxiv.org/abs/1710.06501 (11 pages).

Burgess, C. P. et al., "Understanding disentangling in β-VAE," In proceedings of 31st Conference on Neural Processing Systems (NIPS), 2017, retrieved from Internet: https://arxiv.org/abs/1804.03599 (11 pages).

Carter, S. et al., "Using Artificial Intelligence to Augment Human Intelligence," Distill, 2017, retrieved from Internet: https://distill.pub/2017/aia/ (28 pages).

Eyas, A. et al., "Black-box Adversarial Attacks with Limited Queries and Information," Proceedings of the 35th International Conference on Machine Learning, 2018, retrieved from Internet: https://arxiv.org/abs/1804.08598 (10 pages).

Girshick, R., "Fast R-CNN," In Proceedings of IEEE International Conference on Computer Vision, 2015, retrieved from Internet: https://www.cv-foundation.org/openaccess/content_iccv_2015/papers/Girshick_Fast_R-CNN_ICCV_2015_paper.pdf (9 pages).

Girshick, R. et al., "Rich feature hierarchies for accurate object detection and semantic segmentation," In Proceedings of IEEE Computer Society Conference on Computer Vision and Pattern Recognition, 2014, retrieved from Internet: https://www.cv-foundation.org/openaccess/content_cvpr_2014/papers/Girshick_Rich_Feature_Hierarchies_2014_CVPR_paper.pdf (8 page).

Goodfellow, I. J. et al., "Explaining and Harnessing Adversarial Examples," In Proceedings of International Conference on Learning Representations, 2015, retrieved from Internet: https://arxiv.org/abs/1412.6572 (11 pages).

Hoiem, D. et al., "Diagnosing Error in Object Detectors," European Conference on Computer Vision, 2012, LNCS vol. 7574, 340-353 (14 pages).

Jou, X. et al., "Deep Feature Consistent Variational Autoencoder," 2016, retrieved from Internet: https://arxiv.org/abs/1610.00291 (9 pages).

Howard, A. G. et al., "MobileNets: Efficient Convolutional Neural Networks for Mobile Vision Applications," 2017, retrieved from Internet: https://arxiv.org/pdf/1704.04861.pdf (9 pages).

John, V. et al., "Traffic Light Recognition in Varying Illumination using Deep Learning and Saliency Map," in proceedings of 17th IEEE International Conference on Intelligent Transportation Systems (ITSC), 2014, retrieved from Internet: https://www.researchgate.net/publication/265014373_Traffic_Light_Recognition_in_Varying_Illumination_using_Deep_Learning_and_Saliency_Map (6 pages).

Wang, J. et al., "SCANViz: Interpreting the Symbol-Concept Association Captured by Deep Neural Networks through Visual Analytics," In proceedings of IEEE Pacific Visualization Symposium (PacificVis), 2020, retrieved from Internet: https://www.researchgate.net/publication/341109762_SCANViz_Interpreting_the_Symbol-Concept_Association_Captured_by_Deep_Neural_Networks_through_Visual_Analytics (10 pages).

Kurakin, A. et al., "Adversarial Examples in the Physical World," In proceedings of International Conference Learning Representations, 2017, retrieved from Internet: https://openreview.net/pdf?id=HJGU3Rodl (14 pages).

Li, Y. et al., "N Attack: Learning the Distributions of Adversarial Examples for an Improved Black-Box Attack on Deep Neural Networks," in Proceedings of 36th International Conference on Machine Learning, 2019 (11 pages).

Lin, T.-Y. et al., "Focal Loss for Dense Object Detection," In proceedings of IEE Transactions on Pattern Analysis and Machine Intelligence, 2017, retrieved from Internet: https://arxiv.org/abs/1708.02002v1 (10 pages).

Lin, T.-Y. et al., "Microsoft COCO: Common Objects in Context," In proceedings of IEEE Computer Society Conference on Computer Vision and Pattern Recognition, 2015, retrieved from Internet: https://arxiv.org/abs/1405.0312v3 (15 pages).

(56) References Cited

OTHER PUBLICATIONS

Liu, M. et al., "Towards Better Analysis of Deep Convolutional Neural Networks," in proceedings of IEEE Transactions on Visualization and Computer Graphics, 2017; retrieved from Internet: https://arxiv.org/abs/1604.07043 (10 pages).
Liu, S. et al., "Towards better analysis of machine learning models: A visual analytics perspective," Visual Informatics, Jan. 2017, vol. 1, 48-56 (9 pages).
Liu, W. et al., "SSD: Single Shot MultiBox Detector," European Conference on Computer Vision, 2016, Lecture Notes in Computer Science, LNCS vol. 9905 (17 pages).
Madry, A. et al., "Towards Deep Learning Models Resistant to Adversarial Attacks," In 6th International Conference on Learning Representations, 2018; retrieved from Internet: https://openreview.net/pdf?d=rJzIBIZAb (23 pages).
Ming, Y. et al., "RuleMatrix: Visualizing and Understanding Classifiers with Rules," In IEEE Transactions on Visualization and Computer Graphics, 2019, retrieved from Internet: https://arxiv.org/pdf/1807.06228.pdf (11 pages).
Possatti, L. C. et al., "Traffic Light Recognition Using Deep Learning and Prior Maps for Autonomous Cars," In IEEE International Joint Conference on Neural Networks, 2019, retrieved from Internet: https://arxiv.org/abs/1906.11886 (8 pages).
Processing, Heidelberg Collaboratory for Image, Bosch Small Traffic Lights Dataset, 2020. https://hci.iwr.uni-heidelberg.de/content/boschsmall-traffic-lights-dataset (3 pages).
Redmon, J. et al., "You Only Look Once: Unified, Real-Time Object Detection," In proceedings of IEEE Computer Society Conference on Computer Vision and Pattern Recognition, 2016, retrieved from Internet: https://openaccess.thecvf.com/content_cvpr_2016/html/Redmon_You_Only_Look_CVPR_2016_paper.html (10 pages).
Ribeiro, M. T. et al., ""Why Should I Trust You?" Explaining the Predictions of Any Classifier," In proceedings of the ACM SIGKDD International Conference on Knowledge Discovery and Data Mining, 2016 (10 pages).
Ross, B. C., "Mutual Information between Discrete and Continuous Data Sets," PLoS ONE, 2014, vol. 9, No. 2, e87357 (5 pages).
Zhang, Q. et al., "Visual Interpretability for Deep Learning: a Survey," in Frontiers of Information Technology & Electronic Engineering, 2018, retrieved from Internet: https://arxiv.org/abs/1802.00614 (11 pages).
Szegedy, C. et al., "Intriguing properties of neural networks," in International Conference on Learning Representations (ICLR), 2014, retrieved from Internet: https://arxiv.org/abs/1312.6199 (10 pages).
Vondrick, C. et al., "Visualizing Object Detection Features," International Journal of Computer Vision, 2016, vol. 119, No. 2 (14 pages).
Wierstra, D. et al., "Natural Evolution Strategies," Journal of Machine Learning Research, 2014, vol. 15, 949-90 (32 pages).
Yuan, J. et al., "A survey of visual analytics techniques for machine learning," Computational Visual Media, 2020 (34 pages).
Zhao, H. et al., "Pyramid Scene Parsing Network," in proceedings of IEEE Conference on Computer Vision and Pattern Recognition, 2017, 2881-2890 (10 pages).
Chen, S.-T. et al., "ShapeShifter: Robust Physical Adversarial Attack on Faster R-CNN Object Detector," in Joint European Conference on Machine Learning and Knowledge Discovery in Databases, Lecture Notes in Computer Science, 2019, LNCS vol. 11051, retrieved from Internet: https://arxiv.org/abs/1804.05810 (16 pages).
Behrendt, K. et al., "A Deep Learning Approach to Traffic Lights: Detection, Tracking, and Classification," IEEE International Conference on Robotics and Automation (ICRA), 2017, 1370-1377 (8 pages).
Choo, J. et al., "Visual Analytics for Explainable Deep Learning," IEEE Computer Graphics and Applications, 2018, 34-92 (9 pages).
Endert, A. et al., "The human is the loop: new directions for visual analytics," Journal of Intelligent Information Systems, Jan. 2014, vol. 43, No. 3, 411-435 (26 pages).
Ward. J. H., "Hierarchical Grouping to Optimize an Objective Function," Journal of the American Statistical Association, Mar. 1963, vol. 58, No. 301, 236-244 (10 pages).
Schneiderman, B., "Human-Centered Artificial Intelligence: Reliable, Safe & Trustworthy," International Journal of Human-Computer Interaction, 2020, vol. 36, No. 6, 495-504 (11 pages).
He, K. et al., "Deep Residual Learning for Image Recognition," arXiv:1512.03385v1, 2015 (12 pages).
Ren, S et al., "Faster R-CNN: Towards Real-Time Object Detection with Region Proposal Networks," arXiv:1506.01497v3, 2016 (14 pages).
Wang, J. et al., "DQNViz: A Visual Analytics Approach to Understand Deep Q-Networks," 2019 (11 pages).
Wang, J. et al., "DeepVID: Deep Visual Interpretation and Diagnosis for Image Classifiers via Knowledge Distillation," IEEE Transactions on Visualization and Computer Graphics, vol. 25, No. 6, Jun. 2019 (13 pages).

* cited by examiner

VISUAL ANALYTICS SYSTEM TO ASSESS, UNDERSTAND, AND IMPROVE DEEP NEURAL NETWORKS

FIELD

The device and method disclosed in this document relates to neural networks and, more particularly, to a visual analytics system for interpreting neural network performance.

BACKGROUND

Unless otherwise indicated herein, the materials described in this section are not admitted to be the prior art by inclusion in this section.

Explainable Artificial Intelligence (XAI) is critical to understanding neural network model performance and has gained increased attention with the advance of complex deep neural network models. Model interpretability is particularly critical in certain high-stakes domains such as autonomous driving (e.g., models for detecting traffic lights or stop signs), healthcare (e.g., models for making medical diagnostic predictions), financial services (e.g., models for detecting fraud or evaluating risk), and so on.

There are two popular paradigms for XAI: local interpretation and global interpretation. Local interpretation aims to explain a neural network model's prediction for a given data point, usually by perturbing a set of inputs and observing its impact on the model prediction. In contrast, global interpretation employs intrinsically interpretable models (e.g., decision tree, rules, or linear models) to approximate a target neural network model's behaviors and then these intrinsically interpretable models are used to understand the target neural network model.

However, both approaches face issues with respect to enabling developers to efficiently understand and interpret behaviors of the neural network model and require a non-trivial amount of human interactions and analysis efforts. Particularly, local interpretation methods only show the impact of features on model predictions at local data points and lack a mechanism to explain model behaviors at scale. Moreover, global interpretation has to balance the trade-off between interpretability and fidelity (i.e., how truthfully a model interpretation can approximate a model behaviors). Finally, both approaches generally lack an efficient mechanism to enable interpretation of the behavior of the model over a particular subset of cases of interest. Accordingly, what is needed is a dynamic and flexible system for interpreting model behavior without the need for excessive human interaction and analysis effort.

SUMMARY

A method for visualizing an operation of a neural network model is disclosed. The method comprises receiving, with a processor, a plurality of images. The method further comprises receiving, with the processor, a plurality of outputs, each output in the plurality of outputs having been outputted by the neural network model responsive to a corresponding image in the plurality of images. The method further comprises receiving, with the processor, a plurality of sets of visual features, each set of visual features having been extracted from a corresponding image in the plurality of images. The method further comprises displaying, on a display screen, a graphical user interface including a graphical depiction of the plurality of outputs, the graphical depiction including a plurality of graphical elements encoding the plurality of outputs which are visually arranged depending on the plurality of sets of visual features.

A system for visualizing an operation of a neural network model is disclosed. The system includes a display screen. The system further includes a memory configured to store (i) a plurality of images, (ii) a plurality of outputs, each output in the plurality of outputs having been outputted by the neural network model responsive to a corresponding image in the plurality of images, and (iii) a plurality of sets of visual features, each set of visual features having been extracted from a corresponding image in the plurality of images. The system further includes a processor operably connected to the display screen and the memory. The processor is configured to read, from the memory, (i) the plurality of images, (ii) the plurality of outputs, and (iii) the plurality of sets of visual features. The processor is further configured to generate, and operate the display screen to display, a graphical user interface including a graphical depiction of the plurality of outputs, the graphical depiction including a plurality of graphical elements encoding the plurality of outputs which are visually arranged depending on the plurality of sets of visual features.

A non-transitory computer readable medium for visualizing an operation of a neural network model is disclosed. The non-transitory computer readable medium stores program instructions that, when executed by a processor, cause the processor to receive a plurality of images. The non-transitory computer readable medium further stores program instructions that, when executed by a processor, cause the processor to receive a plurality of outputs, each output in the plurality of outputs having been outputted by the neural network model responsive to a corresponding image in the plurality of images. The non-transitory computer readable medium further stores program instructions that, when executed by a processor, cause the processor to receive a plurality of sets of visual features, each set of visual features having been extracted from a corresponding image in the plurality of images. The non-transitory computer readable medium further stores program instructions that, when executed by a processor, cause the processor to generate, and operate a display screen to display, a graphical user interface including a graphical depiction of the plurality of outputs, the graphical depiction including a plurality of graphical elements encoding the plurality of outputs which are visually arranged depending on the plurality of sets of visual features.

BRIEF DESCRIPTION OF THE DRAWINGS

The foregoing aspects and other features of the method and system are explained in the following description, taken in connection with the accompanying drawings.

DETAILED DESCRIPTION

Figure 1:
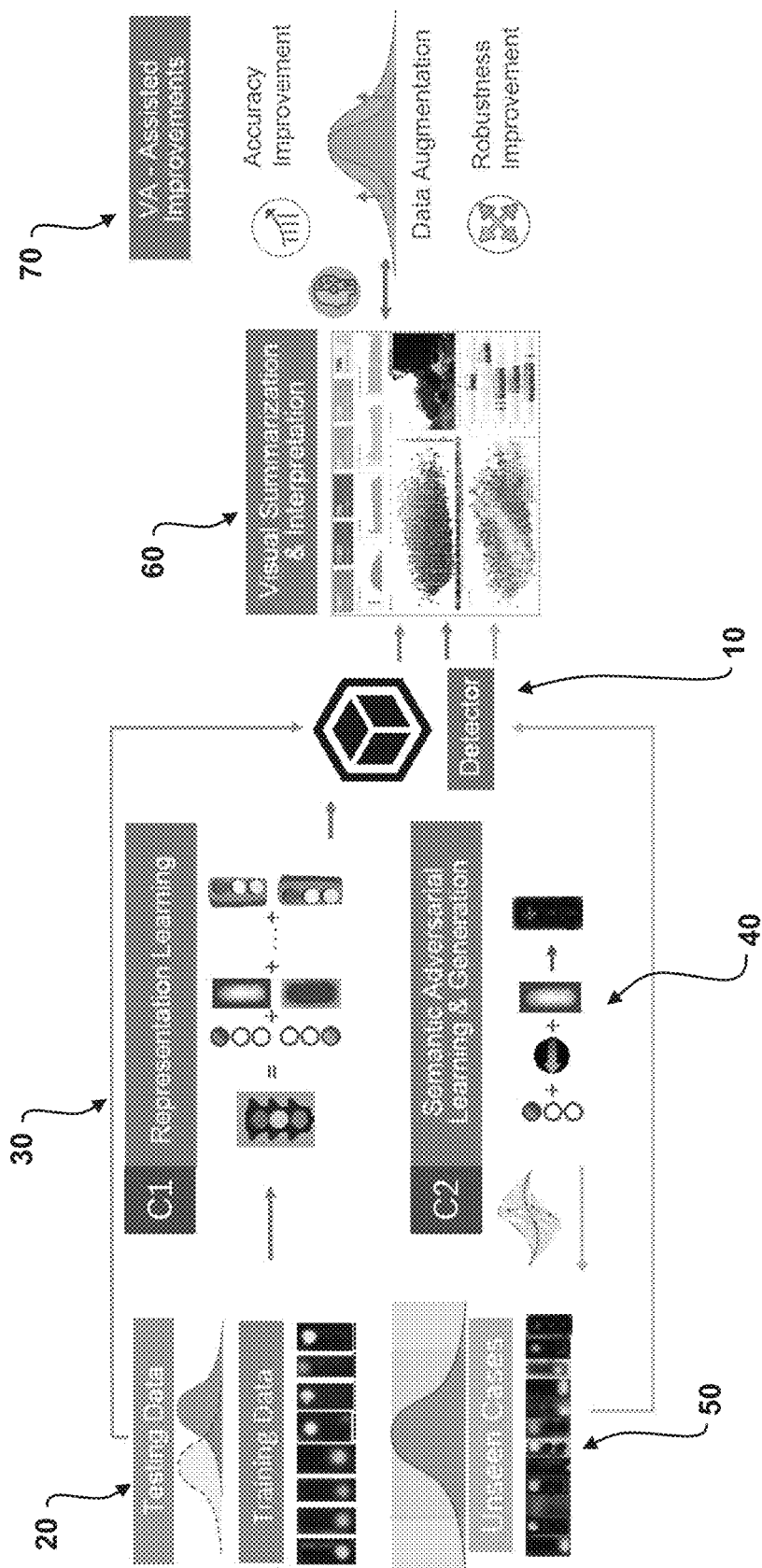
FIG. 1 shows a visual analytics workflow for assessing, understanding, and improving deep neural networks.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

Overview of the Visual Analytics Workflow

FIG. 1 shows a visual analytics workflow for assessing, understanding, and improving deep neural networks. The visual analytics workflow advantageously enables interpretation and improvement of the performance of a neural network model 10, for example an image-based objection detection and classification model, with minimal human-in-the-loop interaction. In the description of the visual analytics workflow, statements that some task, calculation, or function is performed by a component generally refers to a processor executing programmed instructions stored in non-transitory computer readable storage media operatively connected to the processor to manipulate data or to otherwise perform the task or function.

In summary, the visual analytics workflow begins with a plurality of acquired data 20, such as image data. A data representation component 30 of the workflow extracts semantic features of the acquired data 20, such as colors, brightness, background, rotation, etc. of the images or objects in the images. An adversarial learning component 40 of the workflow learns prediction behaviors of the neural network model 10 and generates meaningful adversarial examples in the form of unseen data 50 for the neural network model 10. The acquired data 20 and the unseen data 50 are passed through the neural network 10 to obtain prediction results, such as object detection and classification results. An interactive visualization component 60 of the workflow transforms the prediction results and semantic features into interactive and human-friendly visualizations. Finally, a visual-analytics assisted improvement component 70 of the workflow involves the interaction with visualizations to derive actionable insights and generate additional unseen training data that attempt to improve the accuracy and robustness of the neural network model.

The visual analytics workflow is described in detail herein with respect to a convolutional neural network (CNN) model that is configured to detect objects in images and classify the detected objects. More particularly, the exemplary CNN described herein is configured to detect traffic lights in images of a driving scene and classify the state of the traffic light (e.g., red, green, yellow, off). However, it should be emphasized that visual analytics workflow and system described herein is applicable to a wide variety of deep neural network models for various image processing tasks aside from the illustrative traffic light detector described herein.

It will be appreciated that this kind of traffic light detection is an essential component in autonomous driving. It helps autonomous vehicles perceive driving environments by locating relevant traffic lights and also supports the autonomous vehicle in making decisions by recognizing the current state of traffic lights. State-of-the-art traffic light detectors typically rely on deep CNNs, such as the one described herein, which have exhibited superior performance in many computer vision tasks such as image classification, object detection, semantic segmentation and so on. These detectors are usually trained upon general purpose object detectors and then fine-tuned with domain-specific data (driving scenes with traffic lights) or combined with other prior knowledge about driving scenes, such as object distribution in a scene.

Despite the promising results of CNN based traffic light detectors, one concern is how to thoroughly assess, understand, and improve detector performance before they can be deployed to autonomous vehicles. The concern is two-fold: (1) the accuracy of model must be evaluated and improved over massive amount of acquired data (training and testing data) and (2) the robustness of the model must be evaluated and improved over unseen data (representing potential vulnerability). However, it is a non-trivial task to assess model accuracy and understand when and why models tend to fail. Conventional evaluation and benchmark methods of model accuracy heavily rely on aggregated and over-simplified metrics, such as mAP (mean Average Precision), and fail to provide interpretable and contextual information to understand model performance. Furthermore, although rising attention has been paid to the explainability of general CNNs, methods for unveiling how CNN-based object detectors perform still needs to be investigated.

Another burning need is the ability to identify a model's potential vulnerabilities, and then assess and improve the robustness over potential vulnerable cases. Recently, the advance of adversarial attack and robustness research bears much potential to reveal the vulnerability in deep neural networks. In general, adversarial machine learning fools a classifier with small perturbation of inputs with the gradient information obtained from model. However, two significant challenges exist in applying current adversarial attack methods to understand, evaluate, and improve the robustness of detectors. First, most adversarial attack methods do not generate examples with meaningful changes. Instead, these methods generally aim to fool target models by adding imperceptible noises, and therefore these noises do not correspond to physical meanings or semantics that are easily understood by a developer to provide guidance in improving model robustness in the physical world. Secondly, the mechanism understanding adversarial landscape and improving robustness of a model is desirable. For example, with current adversarial methods, the developer does not know what the common patterns of learned adversarial examples are, why they exist, or how to improve them.

The visual analytics workflow and system described herein advantageously overcomes these hurdles of dissecting model accuracy over existing data, and also assessing and improving model robustness over unseen cases. Particularly, the visual analytics workflow and system enables developers to assess, understand, and improve the accuracy and robustness of a wide variety of neural network models for image processing tasks, including but not limited to the illustrative traffic light detectors described herein. The visual analytics workflow and system is guided by semantic representation learning and a minimal human-in-the-loop approach. Particularly, a representation learning approach is leveraged to efficiently summarize, navigate, and diagnose the performance of the neural network model 10 over large amounts of data. A low-dimensional representation (i.e. latent space) with disentangled intrinsic (semantic) attributes of the input data (such as colors, brightness, background, rotation, etc. of detected traffic lights) is extracted and serves as a fundamental representation of the input data for both human-friendly visualization and semantic adversarial learning.

Illustrative Object Detector Model

As noted above, the visual analytics workflow is described in detail herein with respect to a CNN model that is configured to detect objects in images and classify the detected objects. It will, of course, be appreciated by those of ordinary skill in the art that a CNN model is one type of machine learning model. As used herein, the term "machine learning model" refers to a system or set of program instructions and/or data configured to implement an algorithm, process, or mathematical model (e.g., a neural network) that predicts or otherwise provides a desired output based on a given input. It will be appreciated that, in general, many or most parameters of a machine learning model are not explicitly programmed and the machine learning model is not, in the traditional sense, explicitly designed to follow particular rules in order to provide the desired output for a given input. Instead, a machine learning model is provided with a corpus of training data from which it identifies or "learns" patterns and statistical relationships in the data, which are generalized to make predictions or otherwise provide outputs with respect to new data inputs. The result of the training process is embodied in a plurality of learned parameters, kernel weights, and/or filter values that are used in the various components of the machine learning model to perform various operations or functions.

Figure 2:
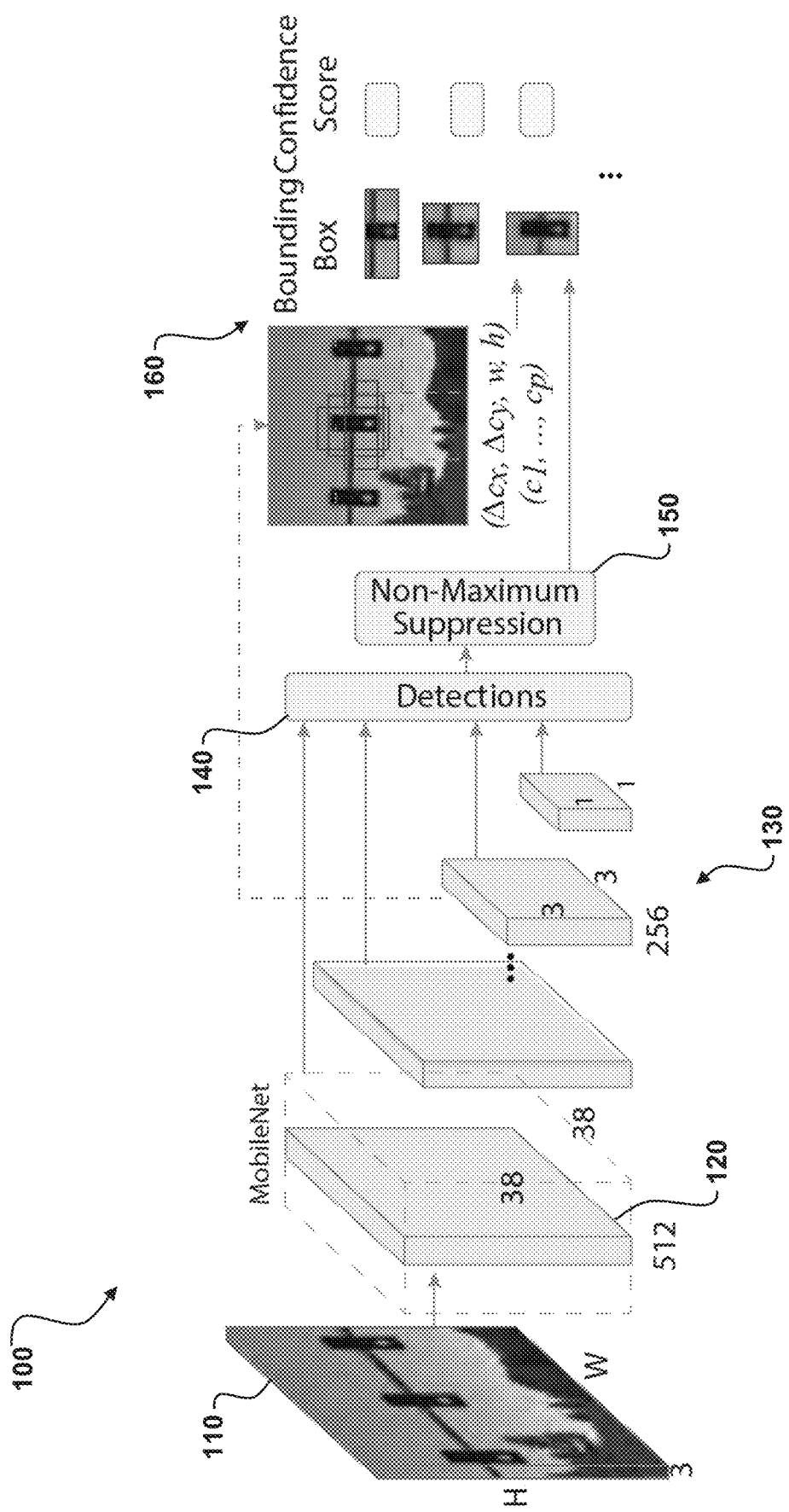
FIG. 2 shows an illustrative embodiment of a CNN-based traffic light detector.

FIG. 2 shows an illustrative embodiment of a CNN-based traffic light detector 100. In the description of the CNN-based traffic light detector 100, statements that a layer or some other component performs some process/function or is configured to perform some process/function means that a processor or controller executes corresponding program instructions stored in a memory with reference to the parameters, kernel weights, and/or filter values learned in a training process to perform the stated operation or function.

It will be appreciated that CNNs are a type of feed-forward neural networks that contain a number of convolutional layers. A conventional convolution layer receives an input, and applies one or more convolutional filters to the input. A convolutional filter, also referred to as a kernel, is a matrix of weights, also referred to as parameters or filter values, which is applied to various chunks of an input matrix such that the matrix of weights is convolved over the input matrix to provide an output matrix. The dimensions of the output matrix is determined by the kernel size of the filter (i.e., the size of the matrix of weights) and by the "stride" of the filter, which indicates how much the chunks of the input matrix overlap with one another during convolution or are spaced apart from one another during convolution. The various layers and filters of a CNN are used to detect various "features" of the input.

The illustrative CNN-based traffic light detector 100 comprises a Single Shot MultiBox Detector (SSD), which provides highly accurate and fast detection. The CNN-based traffic light detector 100 is configured to receive an image 110 of a driving scene as an input. In the illustrated example, the image 110 has a width W, a height H, and a depth of 3 (corresponding to the red, green, and blue input channels and/or color spaces of the image 110). Based on the image 110, the CNN-based traffic light detector 100 is configured to determine and output one or more bounding boxes $b_i$ that each define the possible location of a traffic light. In one embodiment, the bounding boxes $b_i$ take the form of $\{b_i\}$: $(\Delta c_x, \Delta c_y, w, h)$, where i is an index for the particular bounding box, $\Delta c_x$, $\Delta c_y$ are the offsets to center coordinates within the image 110, and w, h are the width and height of the bounding box $b_i$, respectively. The image 110 can be cropped by each respective bounding box $b_i$ to yield individual object images $o_i$. In addition to the bounding boxes $b_i$, the CNN-based traffic light detector 100 is configured to determine and output, for each bounding box $b_i$, probabilities and/or confidence scores $c_j$ for each possible object classification or category (e.g., red, green, yellow, off, and non-object/background), where j indicates a particular one of the possible object classifications or categories.

In the illustrative embodiment, the image 110 is first passed to a backbone network 120, such as ResNet, MobileNet, or similar, which is configured to extract a base feature map (e.g., a 38×38 feature map having a depth of 512 channels). The backbone network 120 may comprise a plurality of convolutional layers, as well as various other layers or processes such as pooling layers (e.g., max pooling, average pooling, etc.), fully connected layers, dropout layers, activation functions (e.g., a rectified linear units (ReLU)), batch normalizations, or L1/L2 regularizations.

The base feature map outputted by the backbone network 120 is passed to one or more additional networks 130 that reduce the dimensionality of the base feature map to one or more smaller sized feature maps (e.g., a 3×3 feature map having a depth of 256 channels). The additional networks 130 may each comprise a plurality of convolution layers, pooling layers, and the like configured to reduce the dimensionality of the base feature map. The additional networks 130 may be connected in sequence with one another to produce several additional feature maps of progressively smaller dimensionality.

A detection component 140 makes k predictions of bounding boxes with different aspect ratios for each cell of each of the feature maps (including the base feature map and each of the smaller sized feature maps). For each predicted bounding box, the detection component 140 determines p class scores (i.e., probabilities and/or confidence scores) with a convolution predictor having a predetermined size (e.g., 3×3), where p is the total number of possible classes. Since the detection component 140 makes predictions based on all of the feature maps, there will frequently be several predicted bounding boxes that essentially correspond to the same prediction, but made based on different sized feature maps. To resolve this, a non-maximum suppression component 150 filters redundant predictions and/or combines predicted bounding boxes that have at least a threshold similarity or overlap with one another to arrive at a final set of predicted the bounding boxes $b_i$. Finally, the CNN-based traffic light detector 100 is configured to output the final set of predicted the bounding boxes $b_i$ and the associated class scores $c_j$, ranked by maximal class scores $c_j$ for non-background classes.

Visual Feature Extraction

Returning to FIG. 1, as mentioned above, a data representation component 30 of the visual analytics workflow extracts visual factors, features, and/or dimensions (also referred to as the "semantic" or "latent" features) of the acquired data 20, as well as the unseen data 50. Given a plurality of object images $o_i$ from the data 20, 50, the data representation component 30 extracts a set of visual factors, features, and/or dimensions from the images which serve as a semantic and/or latent representation of the object images $o_i$. The set of semantic features for a particular object image $o_i$ is denoted herein as $z_i$, where i is an index for the particular object image $o_i$. The interactive visualization component 60 uses these semantic features $z_i$ to assist the developer in interpreting and understanding the neural network model 10. Additionally, the adversarial learning component 40 uses these semantic features $z_i$ to generate meaningful adversarial examples (i.e., the unseen data 50).

The semantic features $z_i$ may include, for example: colors of the images, colors of an object in the image (e.g., a color of the traffic light), brightness of the images, brightness of an object in the image, a background of the image, a rotation of the image, a rotation of an object in the image, a texture of the image, a texture of an object in the image, a size of the image, a size of an object in the image, a weather condition of the image, a time of day of the image, and the like.

It should be appreciated that the semantic features $z_i$ can be extracted from the plurality of the object images $o_i$ using a wide variety of techniques that may, of course, depend on the particular features being extracted. Generally, the methods for extraction will include (i) learning-based methods and (ii) predefined methods for particular features. The learning-based methods can advantageously extract meaningful visual factors from data with an unsupervised approach. For example, a variable auto-encoder (VAE), as discussed below, can learn independent visual features from a set of training images. Conversely, various predefined methods or algorithms can be used to extract particular semantic features. As an example, the size or time of day of the image can be extracted directly from metadata of the image, and weather conditions of the image can be determined using weather data received from an external data source.

Figure 3:
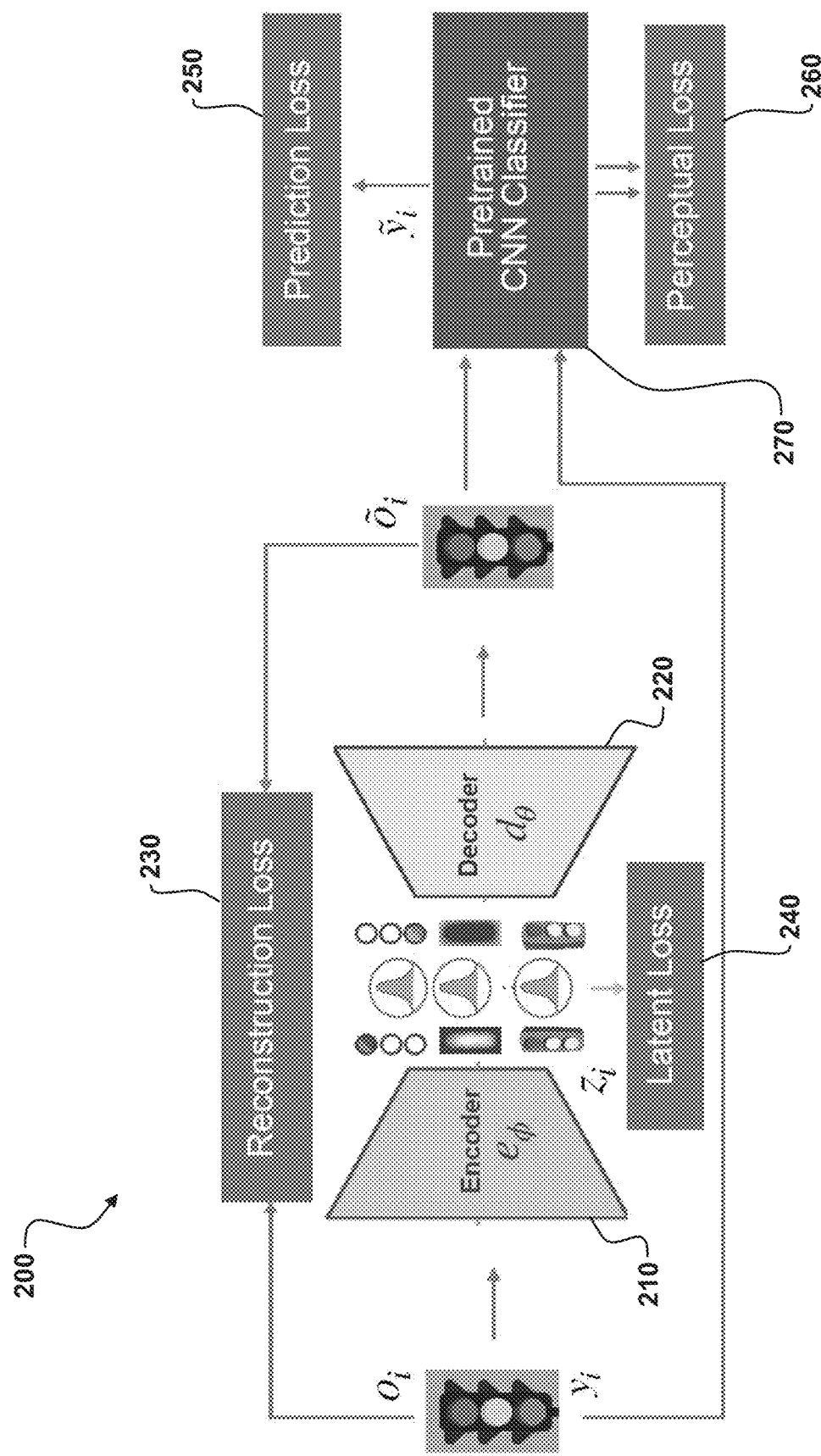
FIG. 3 shows an exemplary $\beta$-variable auto-encoder (VAE) for semantic feature extraction.

In some embodiments, a disentangled representation learning technique is used to extract one or more of the semantic features $z_i$ of the plurality of the object images $o_i$. In particular, FIG. 3 shows β-VAE 200 with customized regularization of losses. Given an object image $o_i \in O^N$ (e.g., a traffic light with size N×N), the β-VAE extracts a latent vector $z_i \in Z^D$ that provides a semantic feature representation of the object image $o_i$, where D is the latent dimension size. The β-VAE includes two components: an encoder 210 and a decoder 220. The encoder 210 is configured to map the object image $o_i$ to the latent vector $z_i$. In other words, the encoder 210 performs an operation $e_\phi : o_i \mapsto z^i$. The decoder 220 is configured to convert the latent vector $z_i$ into a reconstructed object image $õ_i$. In other words, the decoder 220 performs an operation $d_\theta : z_i \mapsto õ_i$.

During training, the β-VAE 200 is optimized with reference to four loss terms. First, a reconstruction loss 230 is calculated based on a comparison between the object image $o_i$ and the reconstructed object image $õ_i$, for example as a mean square error: $MSE = \|o_i - õ_i\|^2$. Second, a latent loss 240 is calculated as a relative entropy between the object image $o_i$ and latent vector $z_i$, for example as a Kullback-Leibler divergence: $D_{KL} = D_{KL}((z_i|o_i)\|(z_i))$. The reconstruction loss 230 and latent loss 240 are used to control the quality of the disentanglement by the β-VAE 200.

In addition to the reconstruction loss 230 and the latent loss 240, a prediction loss 250 and a perceptual loss 260 are also calculated to ensure the reconstruction and generation of realistic images. A CNN classifier 270 is pre-trained to predict traffic light colors. The pre-trained CNN classifier 270 is used to predict the color $ŷ_i$ of the reconstructed object image $õ_i$. The prediction loss 250 is calculated based on a comparison between the actual color $y_i$ and the predicted color $ŷ_i$, for example as a cross entropy loss: $CE(y_i, ŷ_i)$. The pre-trained CNN classifier 270 further used to extract feature maps from convolutional neural network (ConvNet) layers of the CNN classifier 270 ($\phi^l(x)$ from the $l^{th}$ ConvNet layer) of both the object image $o_i$ and the reconstructed object image $õ_i$. The perceptual loss 260 is calculated based on a comparison between the feature map $\phi^l(o_i)$ extracted from the object image $o_i$ and the feature map $\phi^l(õ_i)$ extracted from the reconstructed object image $õ_i$, for example as $\Sigma^L \|\phi^l(o_i) - \phi^l(õ_i)\|^2$.

The final loss term used for training and optimization of the β-VAE 200 is a sum of the reconstruction loss 230, the latent loss 240, the prediction loss 250, and the perceptual loss 260 introduced above: $\mathcal{L} = MSE(o_i, õ_i) + \gamma |D_{KL} - C| + \mu CE(y_i, ŷ_i) + \nu \Sigma^L \|\phi^l(o_i) - \phi^l(õ_i)\|^2$, where $\gamma$ and $C$ are parameters to control disentanglement and $\mu$ and $\nu$ are weights to control reconstruction quality.

After the data representation component 30 extracts the semantic features $z_i$, the plurality of the object images $o_i$ are passed to neural network model 10, which outputs prediction results for the plurality of the object images $o_i$. In particular, the neural network model 10 determines class scores $c_j$ for the plurality of the object images $o_i$.

Visualization of Model Performance

Returning to FIG. 1, as mentioned above, the interactive visualization component 60 of the workflow transforms the class scores $c_j$, the semantic features $z_i$, and other metadata into interactive and human-friendly visualizations. Particularly, interactive visualization component 60 is configured to generate and display a graphical user interface including visualizations of the prediction results of the neural network model 10 and the extracted semantic features $z_i$, which can be manipulated and customized by a user via a user interface. The graphical user interface may include a variety of different types of visualizations, spanning from high-level summaries to very detailed sample-level visualizations.

In the description of these visualizations and graphical user interfaces, statements that a visualization or graphical user interface includes some feature or graphical element generally refers to a processor executing programmed instructions stored in non-transitory computer readable storage media operatively connected to the processor to display the visualization or graphical user interface on a display device to include the feature or graphical element. Additionally, statements that user can select or otherwise interact with some aspect of the visualization or graphical user interface generally refers to a processor receiving user inputs from the user via a user interface, such as a mouse, a keyboard, or a touch screen in a conventional manner.

Figure 4:
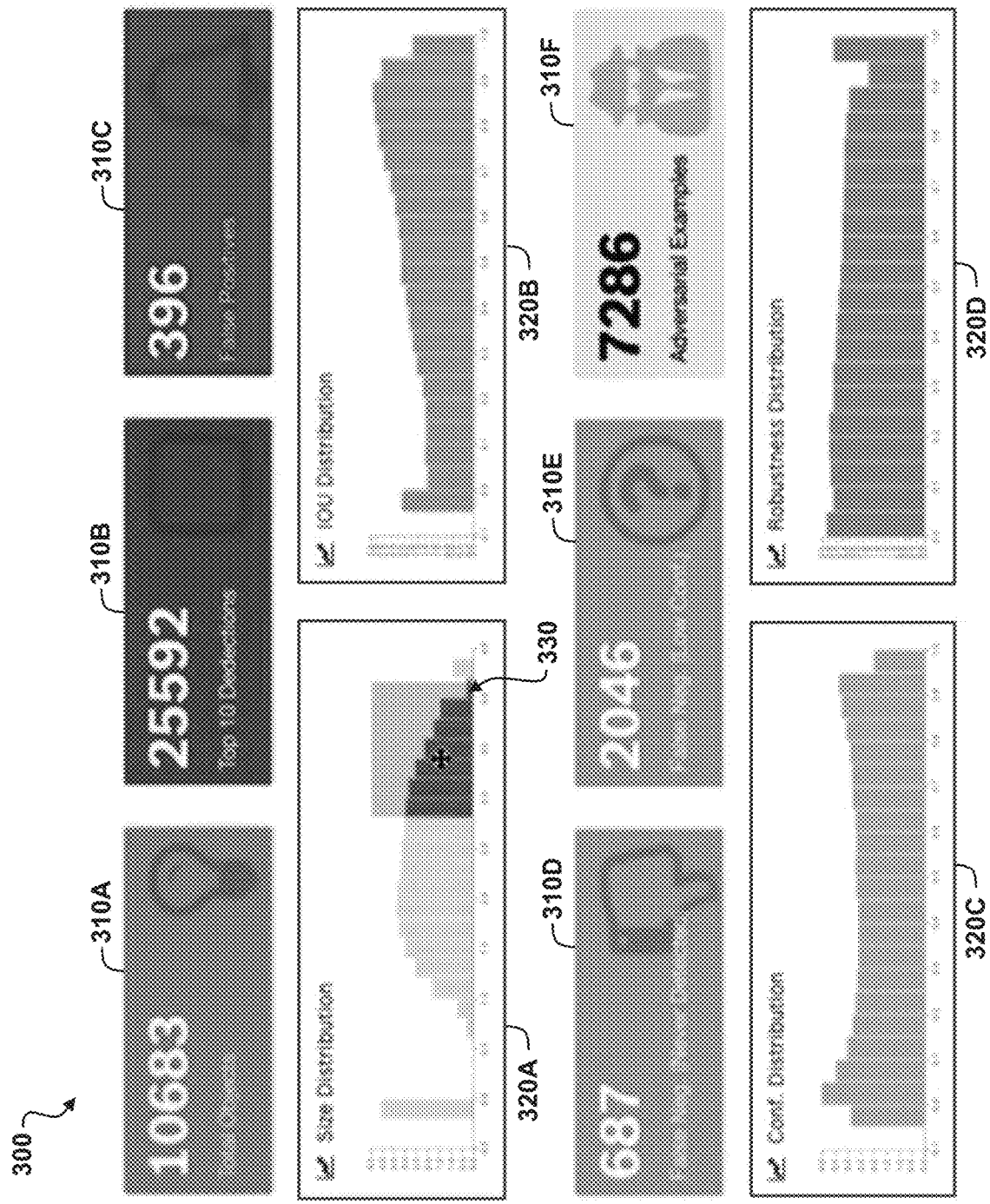
FIG. 4 shows a graphical user interface that includes multi-faceted high-level summaries of the performance of a neural network model.

FIG. 4 shows a graphical user interface 300 that includes multi-faceted high-level summaries of the performance of the neural network model 10. Particularly, the graphical user interface 300 includes a several numerical summaries 310A-F that quantitatively summarize various performance metrics of the neural network model 10 at an aggregate level (e.g., "10683 Total Objects," "25592 Top 10 Detections," "396 False Positives," "687 False Neg. (Never Detected)," "2046 False Neg. (Low Conf.)," and "7286 Adversarial Examples"). As used herein, a "performance metric" refers to any quantitative value that relates to the inputs, outputs, or operation of the neural network model 10. Additionally, the graphical user interface 300 includes a several distribution summaries 320A-D that include histograms having a plurality of graphical elements (i.e., horizontal bars) the summarize various performance metrics of the neural network model 10 at a distributional level (e.g., "Size Distribution," "IOU [Intersection Over Union] Distribution", "Conf. [Confidence] Distribution," and "Robustness Distribution"). It should be appreciated that the particular performance metrics illustrated in graphical user interface 300 are merely exemplary are wide variety of performance metrics and other such metadata can be summarized.

In some embodiments, the distribution summaries 320A-D are coordinated with each other to filter data and support multi-faceted performance analysis for accuracy and robustness in other visualizations. Particularly, the user can select a subset 330 of the horizontal bars in one of the distribution summaries 320A-D. In response to the selection, the numerical summaries 310A-F, as well as other the distribution summaries 320A-D will update to represent only the data corresponding to the selected subset 330. Additionally, the other visualizations discussed below can similarly update to represent only the selected data.

In many embodiments, the visualizations include a plurality of graphical elements that represent the prediction results and/or the semantic features with respect to one or more of the plurality of the object images $o_i$ of the data 20, 50. The extracted semantic features $z_i$ associated with the object images $o_i$ are used to graphically arrange and sort the graphical elements within the visualization. Moreover, the manner in which the semantic features $z_i$ are used to graphically arrange and sort the graphical elements within the visualization can be customized and adjusted by the user via interactions with the graphical user interface.

Figure 5A:
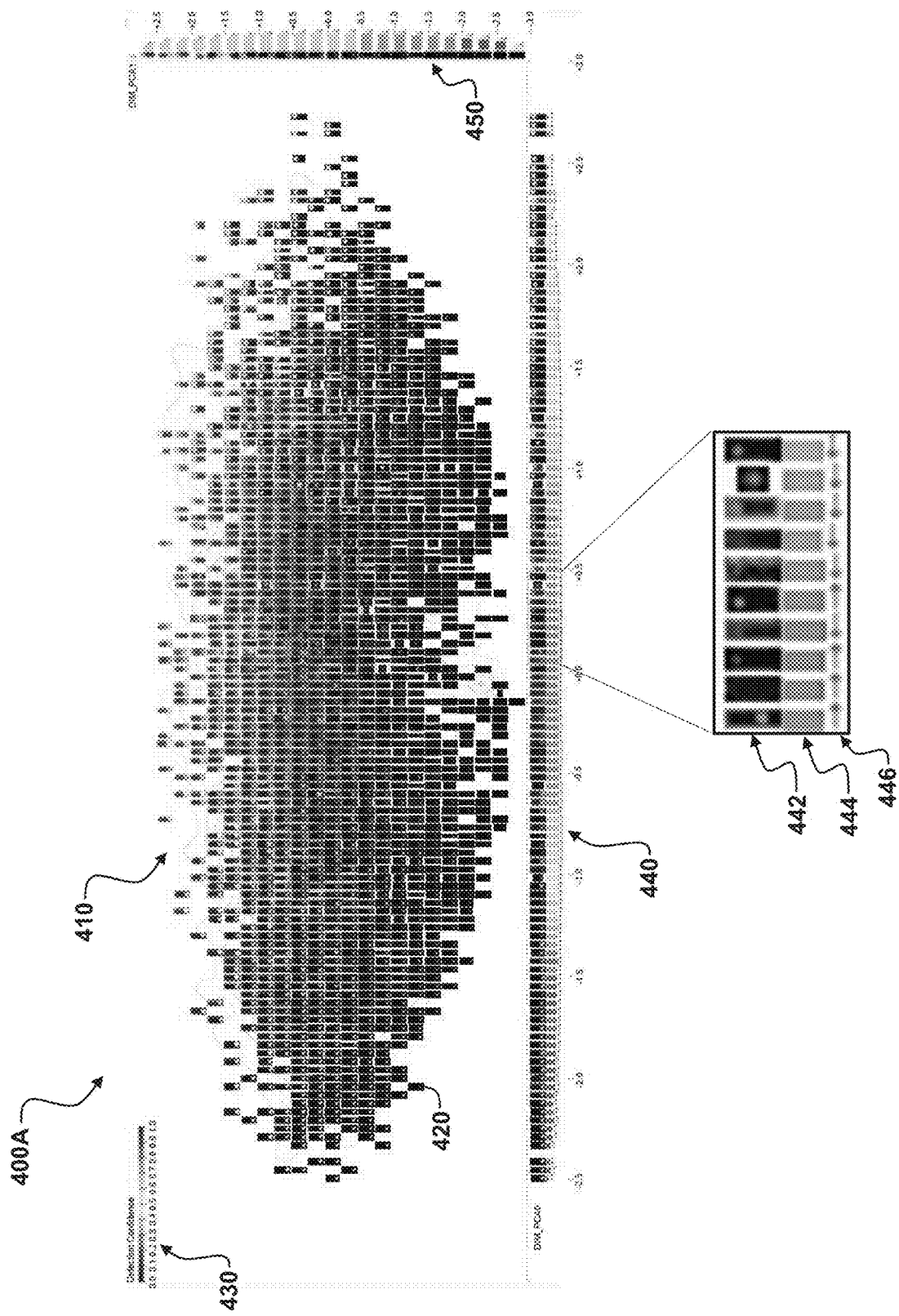
FIG. 5A shows a graphical user interface including a performance landscape visualization for a neural network model.
Figure 5B:
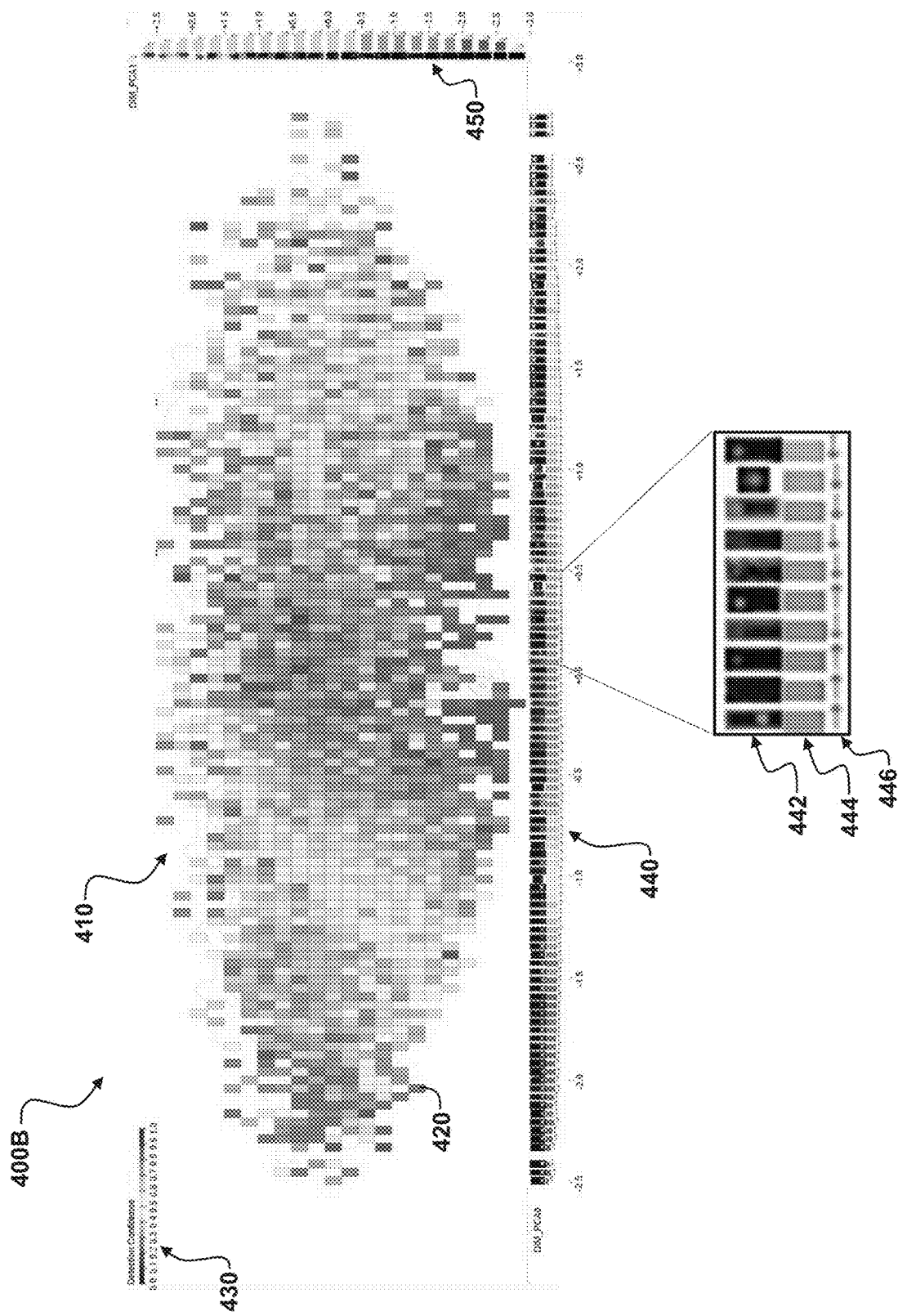
FIG. 5B shows a further graphical user interface including the performance landscape visualization for the neural network model.

FIGS. 5A-B show graphical user interfaces 400A-B that include a performance landscape visualization 410 for the neural network model 10. The performance landscape visualization 410 comprises a plurality of cells 420 arranged in a two-dimensional grid formation. Each cell 420 includes a graphical element that represents one or more individual object images $o_i$. The graphical elements are arranged along the two axes according to selectable dimensions of the extracted semantic features $z_i$. Particularly, the graphical elements are arranged along a horizontal axis according to a first semantic dimension (e.g., "DIM_PCA0") and sorted along a vertical axis according to a second semantic dimension (e.g., "DIM_PCA1"). The semantic dimensions used for the horizontal and vertical axes are selectable by the user via user interactions with the graphical user interfaces 400A-B and are selected from the dimension space D of the semantic features $z_i$.

Each cell 420 is an aggregated bin of one or more individual object images $o_i$. Particularly, each of the plurality of object images $o_i$, is sorted into a respective cell 420 based on their respective values for the selected semantic dimensions for the horizontal and vertical axes. Within each bin, a representative object image $o_i$ is selected. For example, the representative object image $o_i$ can be the object image $o_i$ having a median model score within the bin (e.g., a confidence score) or median value for some other performance metric or semantic feature. The number of cells 420 and the respective bin size for the cells 420 depends upon a selected zoom level for the performance landscape visualization 410. The zoom level is selectable by the user via user interactions with the graphical user interfaces 400A-B.

The graphical element of each cell 420 is configured to represent or encode various types of information. As illustrated in FIG. 5A, in a first mode of the performance landscape visualization 410, the graphical element of each cell 420 comprises a thumbnail of the representative object image $o_i$ for the respective cell 420. As illustrated in FIG. 5B, in a second mode of the performance landscape visualization 410, the graphical element of each cell 420 comprises a colored rectangle. In at least one embodiment, the color of the colored rectangle encodes a model score of neural network model 10 with respect to the one or more individual object images $o_i$ that are sorted into the respective cell 420. The encoded model score may comprise a variety of performance metrics such as a confidence score, an accuracy score, a robustness score, or a class score for a particular class. In one embodiment, the performance landscape visualization 410 includes a legend 430 that explains the correspondence between different colors in the cells 420 and different model scores of the neural network model 10. The particular mode of the performance landscape visualization 410 and the particular information encoded by the graphical elements of the cells 420 is selectable by the user via user interactions with the graphical user interfaces 400A-B. Finally, in one embodiment, the performance landscape visualization 410 includes a contour density map shows the data distribution in the selected semantic space, which is superimposed upon or behind the cells 420 (best seen in FIG. 7).

In the illustrated embodiments, the performance landscape visualization 410 further include aggregated image bars 440, 450 along the horizontal and vertical axes. The aggregated image bars 440, 450 each comprise a number of rows/columns of graphical elements along the respective axis. Particularly, in the illustrated embodiment, the horizontal aggregated image bar 440 includes three rows of graphical elements arranged along the horizontal axis, adjacent to the grid of cells 420. Likewise, the vertical aggregated image bar 450 includes three columns of graphical elements arranged along the horizontal axis, adjacent to grid of cells 420. The plurality of object images $o_i$ are binned and aggregated with the same approach described above for each column of cells 420 420 along the horizontal axis and for each row of cells 420 along the vertical axis.

The horizontal aggregated image bar 440 includes a first row 442 of graphical elements in the form of thumbnails of representative object images $o_i$ for the respective columns of cells 420 (e.g., the object image $o_i$ having the median model score within the bin or median value for some other performance metric or semantic feature). The horizontal aggregated image bar 440 includes a second row 444 of graphical elements in the form of colored rectangles. In at least one embodiment, the color of the colored rectangles encodes a model score of neural network model 10 with respect to the object images $o_i$ in each respective column of cells 420. As above, the encoded model score may comprise a variety of performance metrics such as a confidence score, an accuracy score, a robustness score, or a class score for a particular class. Additionally, in at least one embodiment, a height of the colored rectangles encodes a frequency for each respective column of cells 420 (i.e., the total number of object images $o_i$ sorted into the respective column of cells 420).

In some embodiments, the horizontal aggregated image bar 440 includes a third row 446 of graphical elements in the form of colored arrows in which the color and direction of the arrows encodes the median or average adversarial gradient direction of the neural network model 10 for the object images $o_i$ sorted into the column of cells 420. These adversarial gradient directions are determined using the adversarial learning component 40. In this way, the colored arrows point toward the most ambiguous or challenging object images $o_i$ in the data 20, 50 and enable the developer to identify problem areas of the neural network model 10.

Similar to the horizontal aggregated image bar 440, the vertical aggregated image bar 450 includes: a first column of graphical elements in the form of thumbnails of representative object images $o_i$ for the respective rows of cells 420, a second column of graphical elements in the form of colored rectangles encoding a model score and frequency for the respective rows of cells 420, and a third column of graphical elements in the form of colored arrows that encode adversarial gradient direction for the respective rows of cells 420.

A user can interact with the graphical user interfaces 400A-B via a user interface to zoom and pan the performance landscape visualization 410. Additionally, the user can interact with the graphical user interfaces 400A-B to select the particular semantic features used to sort the object images $o_i$ along each axis. Finally, the user can interact with the graphical user interfaces 400A-B to select what information is encoded by the variously graphical elements in the cells 420 and in the aggregated image bars 440, 450.

Figure 6A:
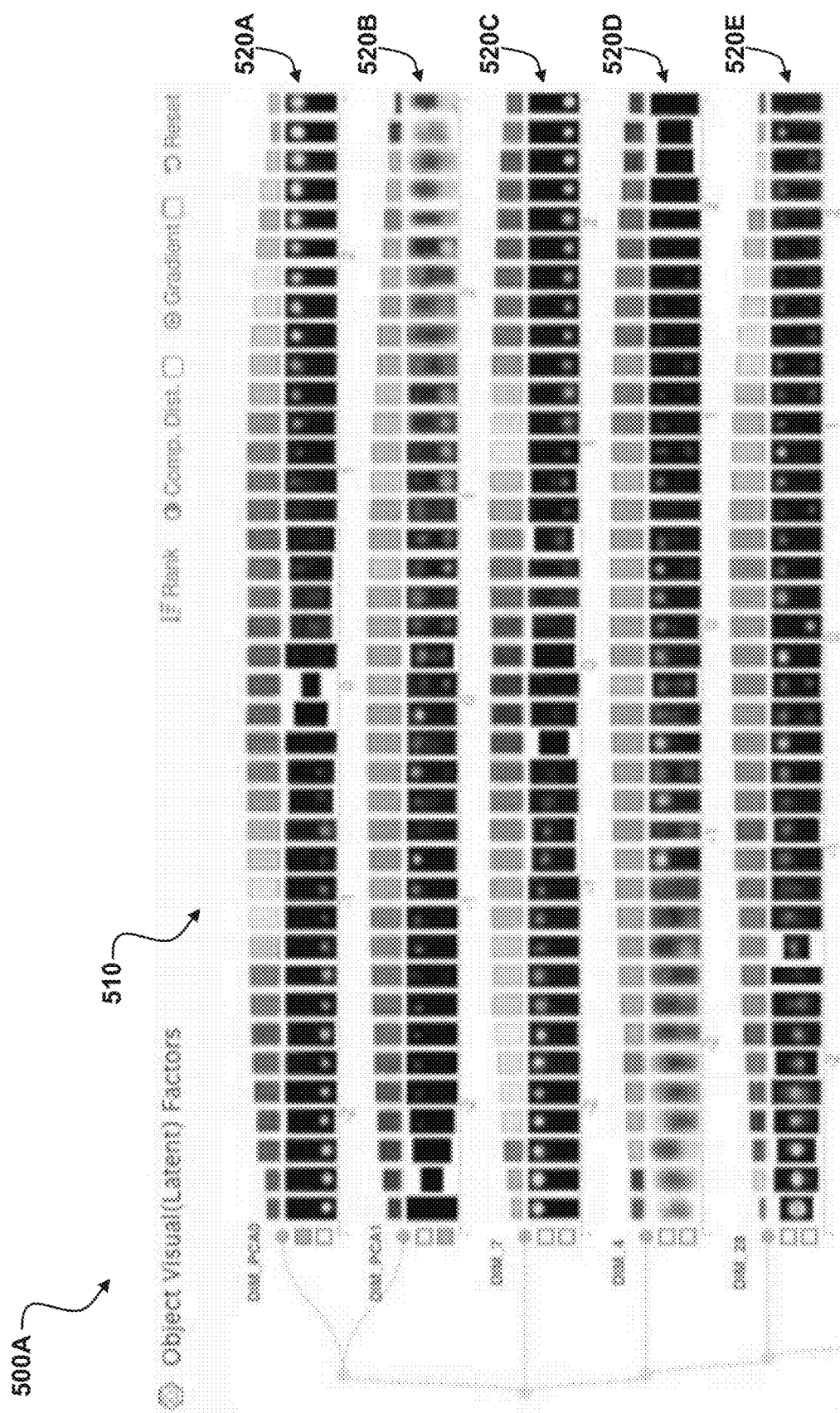
FIG. 6A show a graphical user interface that including a hierarchical parallel coordinate visualization for a neural network model.
Figure 6B:
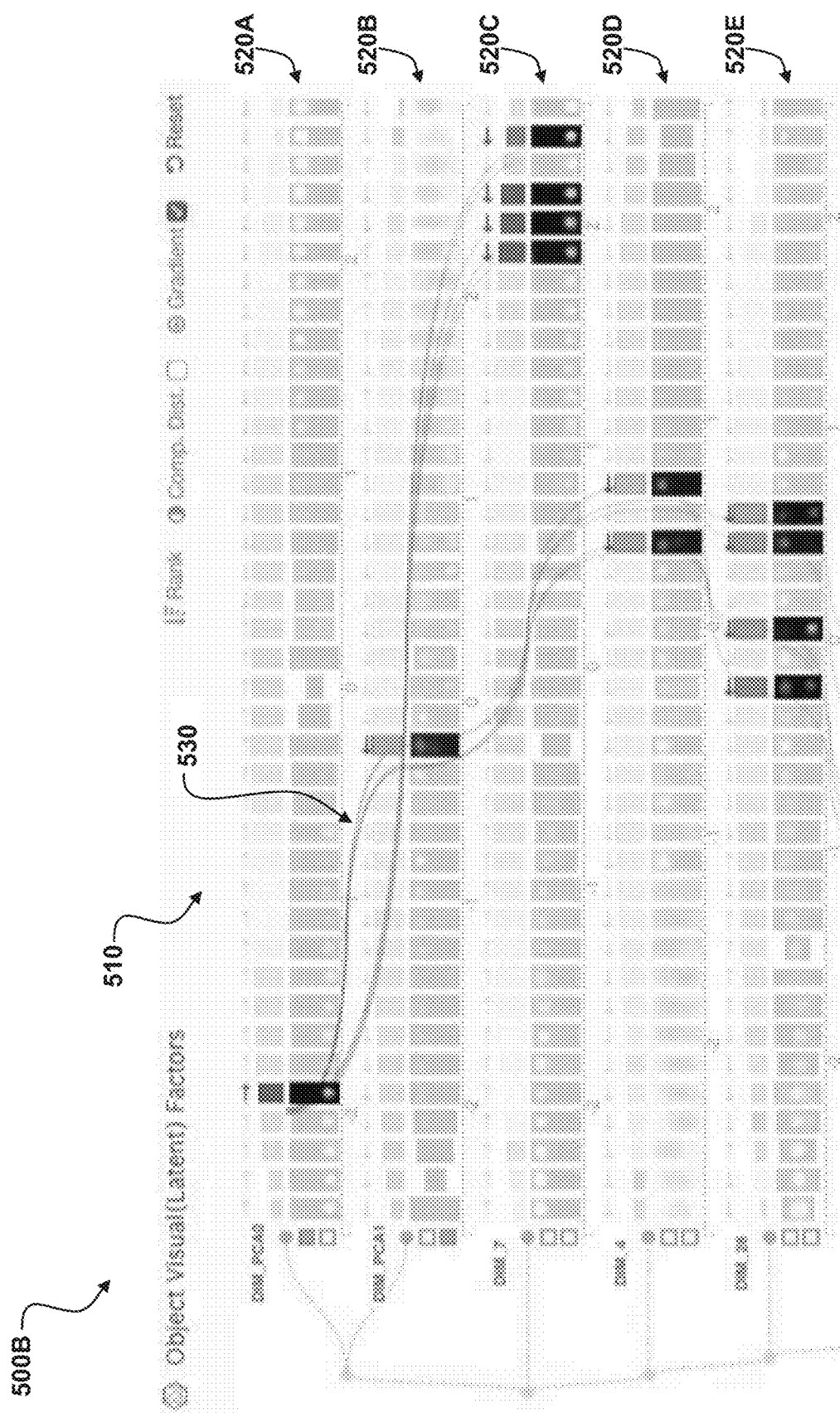
FIG. 6B show a further graphical user interface that including the hierarchical parallel coordinate visualization for a neural network model.

FIGS. 6A-B show graphical user interfaces 500A-B that include a hierarchical parallel coordinate visualization 510 for the neural network model 10. The hierarchical parallel coordinate visualization 510 comprises a plurality of aggregated image bars 520A-E, which are each essentially similar to the aggregated image bars 440, 450 of the performance landscape visualization 410. Each of the aggregated image bars 520A-E corresponds to a particular semantic dimension from the extracted semantic features $z_i$ (e.g., "DIM_PCA0," "DIM_PCA1," "DIM_7," "DIM_4," and "DIM_28"). Within each aggregated image bar 520A-E, the plurality of object images $o_i$ are sorted and aggregated into bins over the respective semantic dimension, in a similar manner discussed above with respect to the cells 420 of the performance landscape visualization 410 and the rows and columns of cells 420 for the aggregated image bars 440, 450.

The aggregated image bars 520A-E each comprise a number of rows of graphical elements. As can be seen in FIG. 6A, the aggregated image bars 520A-E include a first row of graphical elements in the form of thumbnails of representative object images $o_i$ for the respective bins and a second row of graphical elements in the form of colored rectangles encoding a model score and frequency for the respective bins. As shown in FIG. 6B, the aggregated image bars 520A-E may further include a third row of graphical elements in the form of colored arrows that encode adversarial gradient direction for the respective bins.

The aggregated image bars 520A-E are vertically arranged in a hierarchical manner that presents the most salient dimensions of the semantic features $z_i$ at the top or otherwise more prominently within the hierarchical parallel coordinate visualization 510. First, the extracted semantic features $z_i$ are hierarchically clustered with an agglomerative method to efficiently organize and navigate these dimensions. In particular, the clusters are formed by a ward linkage that minimizes the variance of Euclidean distance among all semantic features vectors $z_i$ within a cluster. Only a predetermined number of the top semantic feature dimensions, determined by applying a distance threshold, are made visible in the hierarchical parallel coordinate visualization 510. More semantic feature dimensions can be shown by expanding subtrees. The first two PCA (principal component analysis) components of semantic features $z_i$ are also included to capture the dominate variance of all semantic feature dimensions. They are organized as a special subtree in the root node.

As can be seen in FIG. 6B, the user can select or hover over a particular graphical element of one of the aggregated image bars 520A-E. In response to the user selection, the hierarchical parallel coordinate visualization 510 includes a plurality of curved lines 530 that interconnect the graphical elements and/or bins across all of the aggregated image bars 520A-E that are correlated within one another. In other words, the plurality of curved lines 530 shows bins for other semantic dimensions that are correlated with the bin of selected graphical element. Additionally, in response to the user selection, the hierarchical parallel coordinate visualization 510 highlights the selected graphical element and those of the correlated bins for other semantic dimensions.

The performance landscape visualization 410 and the hierarchical parallel coordinate visualization 510 can be used in concert with one another to quickly assess, understand, and improve the neural network model 10. Particularly, with minimal human interaction, actionable insights can be derived to generate new data that attempt to improve model performance via data augmentation.

In some embodiments, a user can select any dimension from the hierarchical parallel coordinate visualization 510 (i.e., one of the aggregated image bars 520A-E) to utilize along the horizontal or vertical axis of the performance landscape visualization 410. In this way, the user can easily examine what visual semantics are embedded in this dimension. Additionally, the user can select or hover over a particular graphical element and/or bin of one of the aggregated image bars 520A-E and, in response, the performance landscape visualization 410 will highlight the cells 420 thereof that correspond to the selected graphical element and/or bin of one of the aggregated image bars 520A-E.

Figure 7:
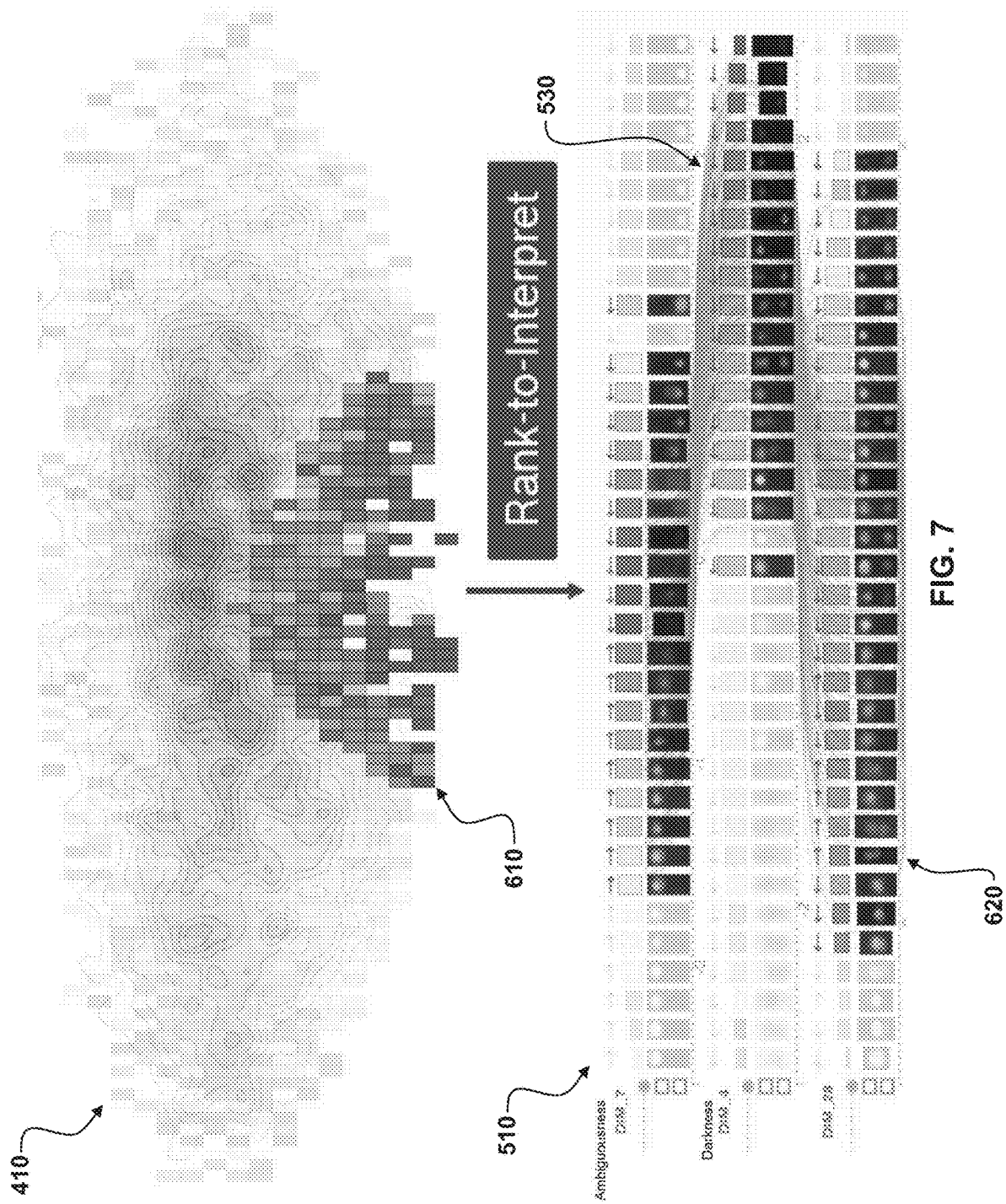
FIG. 7 shows coordination between the performance landscape visualization and the hierarchical parallel coordinate visualization.

With reference to FIG. 7, in some embodiments, a user can use a lasso tool operation or a click-and-drag operation to select a subset 610 of the cells within the performance landscape visualization 410. In response to this selection, the selected subset 610 is highlighted within the performance landscape visualization 410. Additionally, the corresponding graphical elements and/or bins 620 of the aggregated image bars 520A-E are highlighted within the hierarchical parallel coordinate visualization 510 and the plurality of curved lines 530 are displayed to identify correlated bins across multiple semantic dimensions.

In at least one embodiment, in response to selecting the subset 610 of cells 420 in the performance landscape visualization 410, the hierarchical parallel coordinate visualization 510 is reorganized to hierarchically display the most salient dimensions of the semantic features $z_i$ within the data corresponding to the selected subset 610 of cells. Particularly, the hierarchical parallel coordinate visualization 510 ranks dimensions of the semantic features $z_i$ by their importance to separate the selection from other data points. The selected data are marked with a first classification label and the unselected data are marked with a second classification label. A machine learning model is applied to determine which dimensions of the semantic features $z_i$ are most salient in distinguishing between the first class and the second class. More particularly, the selected and unselected data are marked with different labels for a target variable (e.g. a classification score), and their semantic features $z_i$ are used as features to estimate their mutual information (MI) towards the target variable. The dimensions are then ranked by their MI values and agglomeratively organized as a tree structure for the hierarchical parallel coordinate visualization 510. In this way, the user can easily understand the top semantic dimensions explaining the performance with respect to the selected data.

In the illustrated example of FIG. 7, the subset 610 is selected from a central region of the performance landscape visualization 410 in which the cells are predominantly of a first color (e.g., red) that indicates a low confidence score for the object images $o_i$ of the selected subset 610 of cells. After selection, the hierarchical parallel coordinate visualization 510 is updated and conveys that the semantic dimensions corresponding to "darkness" and "ambiguousness" play an important role in the poor performance with respect to the object images $o_i$ of the selected subset 610 of cells. With this insight, the developer can improve the neural network model 10 by obtaining more training data from these two semantic dimensions and retraining the neural network model 10 using the additional training data.

Figure 8:
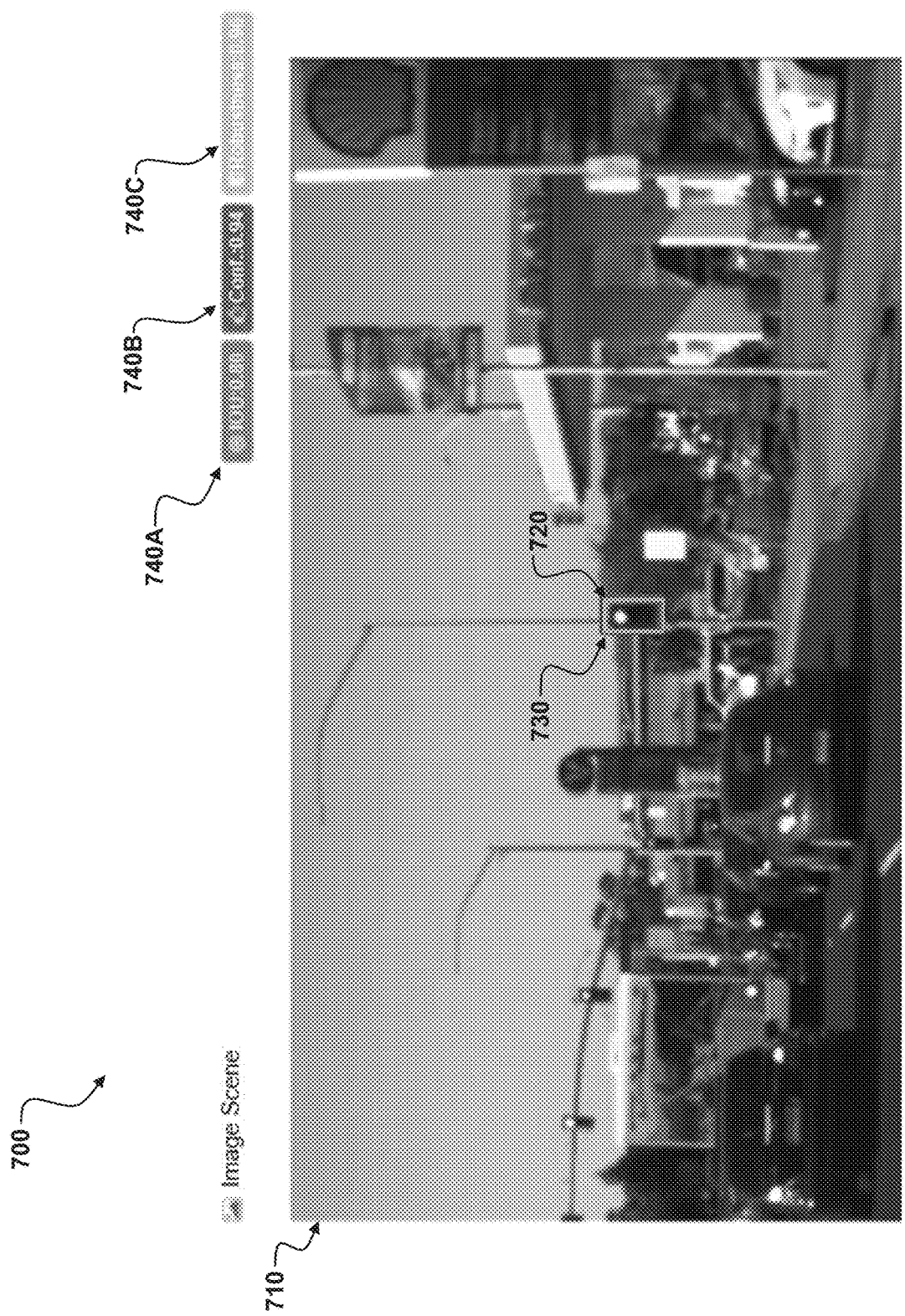
FIG. 8 shows a graphical user interface including an image scene that includes a particular input image to the neural network model.

Finally, FIG. 8 shows a graphical user interface 700 including an image scene 710 that includes a particular input image to the neural network model 10. Particularly, using any of the previously described visualizations, a user can select a particular object image $o_i$. In response to such a selection, the input image 710 that includes the selected object image $o_i$ is displayed. A first box 720 (e.g., green) is drawn around the ground truth bounding box for the selected object image $o_i$ and a second box 730 (e.g., red) is drawn around the predicted bounding box $b_i$ for the selected object image $o_i$. Finally, performance summaries 740A-C are displayed for the selected object image $o_i$ (e.g., "IOU: 0.8," "Conf.: 0.94," and "Robustness: 0.96"). By viewing the image scene 710 associated with a particular object image $o_i$, the developer can better understand the context of performance issues with the neural network model 10.

Exemplary Visual Analytics System

Figure 9:
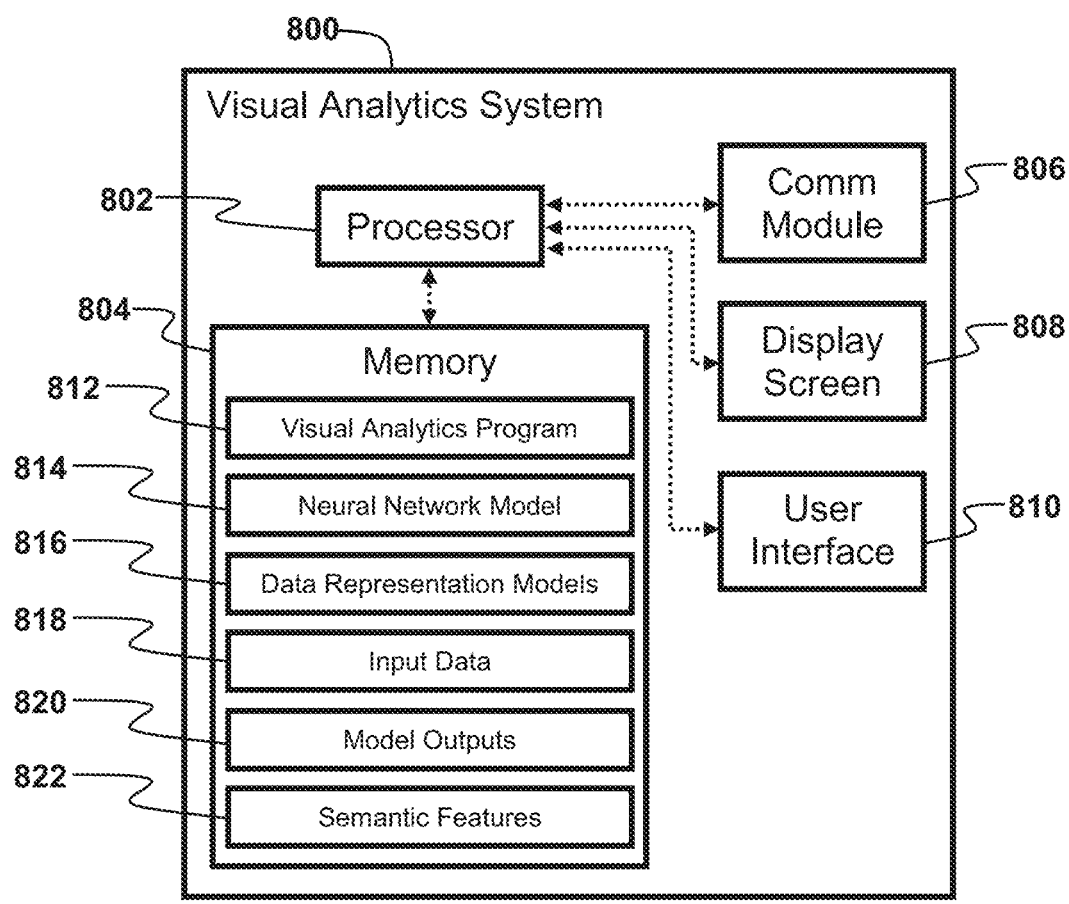
FIG. 9 shows a block diagram of an exemplary embodiment of a visual analytics system.

FIG. 9 shows a block diagram of an exemplary embodiment of a visual analytics system 800. The visual analytics system 800 advantageously utilizes the visual analytics workflow and interactive visualizations described above to enable a developer to assess, understand, and improving deep neural networks. In particular, the visual analytics system 800 advantageously enables interpretation and improvement of the performance of a neural network model with minimal human-in-the-loop interaction by leveraging extracted semantic features of the input data to generate interactive and human-friendly visualizations of the results and performance of the model. Using these visualizations, the developer can derive actionable insights to improve the accuracy and robustness of the neural network model In the illustrated exemplary embodiment, the visual analytics system 800 comprises at least one processor 802, at least one memory 804, a communication module 806, a display screen 808, and a user interface 810. However, it will be appreciated that the components of the visual analytics system 800 shown and described are merely exemplary and that the visual analytics system 800 may comprise any alternative configuration. Particularly, the visual analytics system 800 may comprise any computing device such as a desktop computer, a laptop, a smart phone, a tablet, or other personal electronic device. Thus, the visual analytics system 800 may comprise any hardware components conventionally included in such computing devices.

The memory 804 is configured to store data and program instructions that, when executed by the at least one processor 802, enable the visual analytics system 800 to perform various operations described herein. The memory 804 may be of any type of device capable of storing information accessible by the at least one processor 802, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. Thus, the at least one processor 802 may include a central processing unit, graphics processing units, multiple processing units, dedicated circuitry for achieving functionality, programmable logic, or other processing systems. Additionally, it will be appreciated that, although the visual analytics system 800 is illustrated as single system, the visual analytics system 800 may comprise several distinct systems that work in concert to achieve the functionality described herein.

The communication module 806 may comprise one or more transceivers, modems, processors, memories, oscillators, antennas, or other hardware conventionally included in a communications module to enable communications with various other devices. In at least some embodiments, the communication module 806 includes a Wi-Fi module configured to enable communication with a Wi-Fi network and/or Wi-Fi router (not shown). In further embodiments, the communications modules 46 may further include a Bluetooth® module, an Ethernet adapter and communications devices configured to communicate with wireless telephony networks.

The display screen 808 may comprise any of various known types of displays, such as LCD or OLED screens and is configured to display a variety of graphical user interfaces to a user. In some embodiments, the display screen 808 may comprise a touch screen configured to receive touch inputs from the user. The user interface 810 may suitably include a variety of devices configured to enable local operation of the visual analytics system 800 by a user, such as a mouse, trackpad, or other pointing device, a keyboard or other keypad, speakers, and a microphone, as will be recognized by those of ordinary skill in the art. Alternatively, in some embodiments, a user may operate the visual analytics system 800 remotely from another computing device which is in communication therewith via the communication module 806 and has an analogous user interface.

The program instructions stored on the memory 804 include a visual analytics program 812, neural network model instructions 814, and data representation model instructions 816. The neural network model instructions 814 implement the neural network model 10 (e.g., the CNN-based traffic light detector 100) and are executed by the processor 802 to determine the prediction results (e.g. the bounding boxes $b_i$ and the associated class scores $c_j$). The data representation model instructions 816 implement the data representation component 30 (e.g., the β-VAE 200 and other learning or predefined models) and are executed by the processor 802 to extract the semantic features (e.g., the semantic features $z_i$). The processor 802 executes the visual analytics program 812 to generate interactive and human-friendly visualizations, as described above.

The data stored on the memory 804 include input data 818, model outputs 820, and semantic features 822. The input data 818, for example, includes the acquired data 20 and the unseen data 50 (e.g., the plurality of object images $o_i$). The model outputs 820 include the prediction results (e.g. the bounding boxes $b_i$ and the associated class scores $c_j$), as well as various other metadata, such as calculated performance metrics or intermediate data (e.g., CNN feature maps) from the neural network model 10. Finally, the semantic features 822 include the semantic features extracted from the input data 818 (e.g., the semantic features $z_i$ extracted from the plurality of object images $o_i$).

Method for Operating the Visual Analytics System

Figure 10:
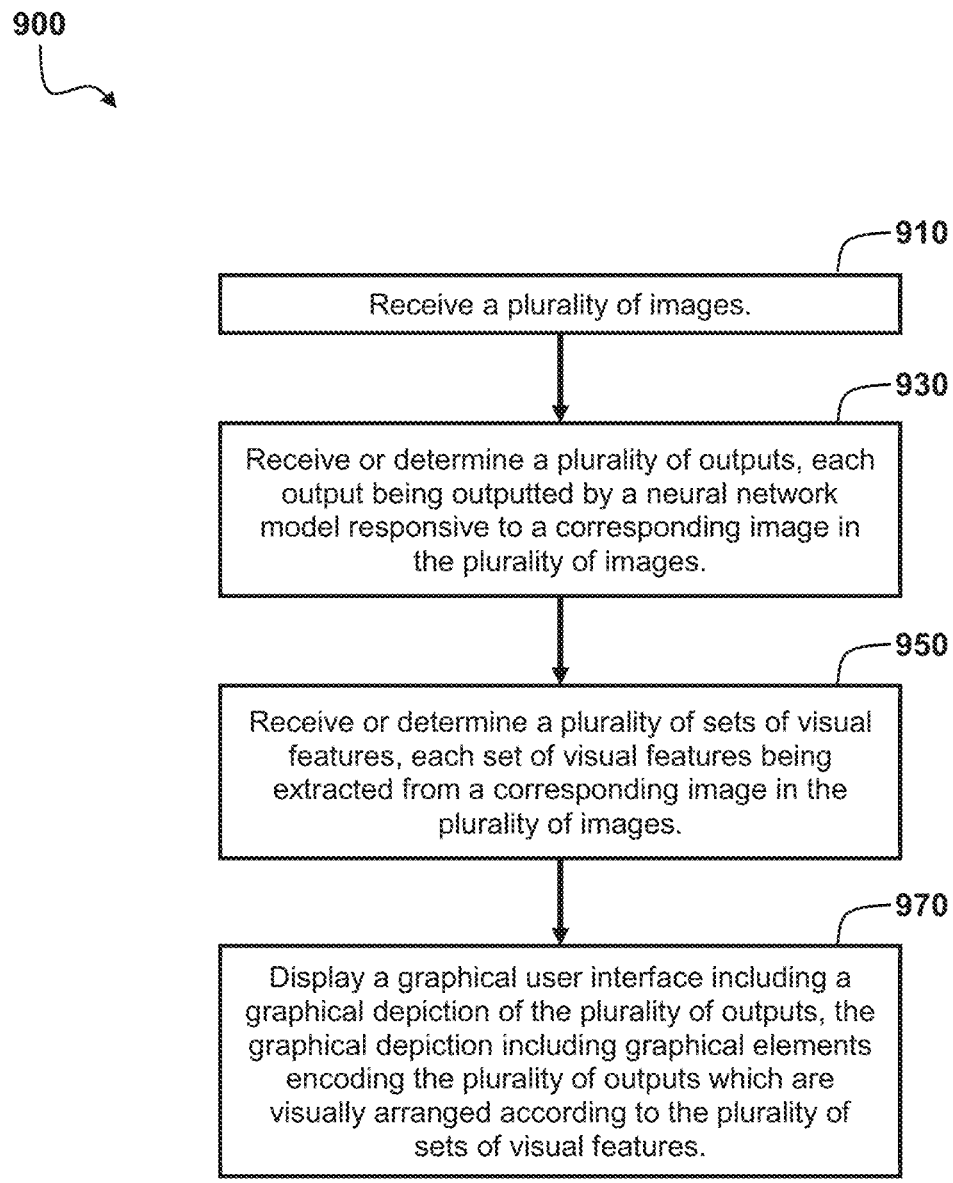
FIG. 10 shows a flow diagram for a method for operating the visual analytics system.

FIG. 10 shows a flow diagram for a method 900 for operating the visual analytics system 800. The method 900 improves upon the functioning of the visual analytics system 800 by advantageously providing a graphical depiction of the outputs of the neural network model 10 in which the graphical elements representing the outputs with respect to particular object images $o_i$ are visually arranged depending on the associated semantic features $z_i$ extracted from those object images $o_i$. In this way, semantic features $z_i$ can be utilized to visual assess, understand, and improve the performance of the neural network model 10 with minimal human interaction and analysis efforts.

In the description of these method, statements that some task, calculation, or function is performed refers to a processor (e.g., the processor 802 of the visual analytics system 800) executing programmed instructions (e.g., the visual analytics program 812, the neural network model instructions 814, and the data representation model instructions 816) stored in non-transitory computer readable storage media (e.g., the memory 804 of the visual analytics system 800) operatively connected to the processor to manipulate data or to operate one or more components of the visual analytics system 800 to perform the task or function. Additionally, the steps of the methods may be performed in any feasible chronological order, regardless of the order shown in the figures or the order in which the steps are described.

The method 900 begins with receiving a plurality of images (block 910). Particularly, with respect to the embodiments described in detail herein, the processor 802 of the visual analytics system 800 is configured to execute program instructions of the visual analytics program 812 to receive and/or read a plurality of object images $o_i$ from the input data 818 on the memory 804.

The method 900 continues with receiving or determining a plurality of outputs, each output being outputted by a neural network model responsive to a corresponding image in the plurality of images (block 930). Particularly, with respect to the embodiments described in detail herein, the processor 802 is configured to execute program instructions of the visual analytics program 812 to receive and/or read a plurality of outputs (e.g., the bounding boxes $b_i$ and the associated class scores $c_j$), as well as various other metadata, such as performance metrics calculated based on the plurality of outputs or intermediate data (e.g., CNN feature maps) from the neural network model 10, from the model outputs 820 on the memory 804.

In at least one embodiment, the processor 802 is configured execute the neural network model instructions 814 to determine the above described outputs with respect to each of the object images $o_i$. In one embodiment, the processor 802 is configured to store the outputs in the memory 804 (i.e., the model outputs 820) for later usage by the visual analytics program 812. However, in some embodiments, the above described outputs may be generated by some external computing device and the processor 802 is configured to operate the network communication module 806 to receive the outputs from the external computing device.

The method 900 continues with receiving or determining a plurality of sets of visual features, each set of visual features being extracted from a corresponding image in the plurality of images (block 950). Particularly, with respect to the embodiments described in detail herein, the processor 802 is configured to execute program instructions of the visual analytics program 812 to receive and/or read a plurality of the visual features (e.g., the semantic features $z_1$ extracted from the plurality of object images $o_i$) from the semantic features 822 on the memory 804.

In at least one embodiment, the processor 802 is configured execute the data representation model instructions 816 to extract the above described visual features with respect to each of the object images $o_i$. In one embodiment, the processor 802 is configured to store the extracted visual features in the memory 804 (i.e., the semantic features 822) for later usage by the visual analytics program 812. However, in some embodiments, the above described visual features may be extracted by some external computing device and the processor 802 is configured to operate the network communication module 806 to receive the extracted visual features from the external computing device.

The method 900 continues with displaying a graphical user interface including a graphical depiction of the plurality of outputs, the graphical depiction including graphical elements encoding the plurality of outputs which are visually arranged according to the plurality of sets of visual features (block 970). Particularly, with respect to the embodiments described in detail herein, the processor 802 is configured to execute program instructions of the visual analytics program 812 to generate a graphical depiction of the plurality of outputs. In some embodiments, the graphical depiction may take the form of any combination of the visualizations discussed above, including the numerical summaries 310A-F, the distribution summaries 320A-D, the performance landscape visualization 410, the hierarchical parallel coordinate visualization 510, and the image scene 710, as well as similar visualizations not described in detail herein. The processor 802 is configured to operate the display screen 808 to display a graphical user interface that includes the generated graphical depiction and/or visualization.

In at least some embodiments, the graphical depiction and/or visualization has a plurality of graphical elements that encode the plurality of outputs (e.g., the associated class scores $c_j$ or various other metadata, such as performance metrics calculated based on the class scores $c_j$). In at least some embodiments, the plurality of graphical elements of the graphical depiction and/or visualization are visually arranged depending on the plurality of the visual features (e.g., the semantic features $z_i$ extracted from the plurality of object images $o_i$).

In at least some embodiments, the processor 802 is configured to sort the plurality of images (i.e., the plurality of object images $o_i$) into a plurality of bins based on at least one visual feature in the plurality of the visual features (i.e., based on at least one particular dimension of the semantic features $z_i$ extracted from the plurality of object images $o_i$). Each bin defines a range of values for the at least one visual feature. After sorting the plurality of images into the plurality of bins, the processor 802 is configured to generate the graphical depiction and/or visualization such that each graphical element encodes the outputs corresponding to the images that are sorted into a corresponding bin. In this way, each graphical element of the graphical depiction and/or visualization corresponds to a respective bin.

In one embodiment, the processor 802 generates graphical depiction and/or visualization in which the graphical elements are visually arranged along one axis in accordance with the ranges of values defined by the corresponding bins for a particular visual feature (i.e., a particular dimension of the semantic features $z_i$). For example, in the case of the aggregated image bars 440, 450 of the performance landscape visualization 410 (FIGS. 5A-B), the rows/columns of graphical elements are visually arranged along the horizontal/vertical axis according to the ranges of values defined by the corresponding bins. Likewise, in each of the aggregated image bars 520A-E of the hierarchical parallel coordinate visualization 510 (FIGS. 6A-B), the rows of graphical elements are visually arranged along a horizontal axis according to the ranges of values defined by the corresponding bins.

In one embodiment, the processor 802 generates graphical depiction and/or visualization in which the graphical elements are visually arranged in a grid formation along two orthogonal axes in accordance with the ranges of values defined by the corresponding bins for two particular visual features (i.e., two particular dimensions of the semantic features $z_i$). For example, in the performance landscape visualization 410 (FIGS. 5A-B), the cells 420 are arranged within a two-dimensional grid formation and visually arranged along the horizontal and vertical axes of the grid formation according to the ranges of values defined by the corresponding bins.

In one embodiment, the processor 802 generates a plurality of graphical depictions and/or visualizations. Each of graphical depictions and/or visualizations corresponds to respective visual feature (e.g., a particular dimension of the semantic features $z_i$). The graphical elements of each graphical depiction and/or visualization are arranged along at least one axis in accordance with the ranges of values defined by corresponding bins for the respective visual feature. In one example, in the hierarchical parallel coordinate visualization 510 (FIGS. 6A-B) includes a plurality of aggregated image bars 520A-E, each corresponding to a particular visual feature. The processor 802 is configured to determine a hierarchy of the respective visual features of the plurality of graphical depictions and/or visualizations (e.g., by agglomerative hierarchical clustering, as discussed above). The processor 802 operates the display screen 808 to display the graphical user interface with the plurality of graphical depictions and/or visualizations arranged according to determined hierarchy (e.g., as shown in FIGS. 6A-B).

The graphical elements of the generated graphical depiction and/or visualization may take a variety of forms. In some embodiments, the processor 802 generates at least some of the graphical elements in the form of a thumbnail of a representative image of the plurality of images that are sorted into the corresponding bin. In some embodiments, the processor 802 generates at least some of the graphical elements in the form of a colored rectangle. The colored rectangles have a color that encodes the outputs or a performance metric of the neural network model 10 with respect to images sorted into the corresponding bin. Additionally, the colored rectangles have a size, height, shape, or the like that encodes a total number of images sorted into the corresponding bin.

The processor 802 is configured to operate the user interface 810 receive user inputs from a user and adjust the graphical depiction and/or visualization depending on the received user inputs. In one example, the processor 802 receives user input defining a selection of a particular visual feature (i.e., a particular dimension of the semantic features $z_i$) for sorting the graphical elements in the graphical depiction and/or visualization. The processor 802 is configured to re-sort the plurality of images into new bins based on the newly selected visual feature and update the graphical depiction and/or visualization accordingly. For example, the user can select a visual feature to be used for the horizontal axis or vertical axis of the performance landscape visualization 410.

In one embodiment, the processor 802 receives a selecting a subset of graphical elements within a first graphical depiction. In response, the processor 802 is configured to adjust a second graphical depiction depending on the selected subset graphical elements within the first graphical depiction. In one embodiment, the processor 802 is configured to adjust the second graphical depiction so as to highlight or otherwise emphasis a subset of graphical elements within the second graphical depiction for which the ranges of values for the visual feature(s) defined by the corresponding bins correlate with to the ranges of values for the visual feature(s) defined by the corresponding bins of the selected subset of graphical elements within a first graphical depiction. In one example, in response to selecting a particular graphical element and/or bin of the aggregated image bars 520A of the hierarchical parallel coordinate visualization 510 (FIG. 6B), the aggregated image bars 520B-E are adjusted to highlight the correlated graphical elements and/ or bins (e.g., by dimming the uncorrelated graphical elements and/or bins and displaying the plurality of curved lines 530). In another example, in response to selecting a group of cells 420 in the performance landscape visualization 410 (FIG. 7), the aggregated image bars 520A-E are adjusted to highlight the graphical elements and/or bins corresponding to the selected group of cells 420 (e.g., by dimming the unselected graphical elements and/or bins and displaying the plurality of curved lines 530).

In one embodiment, in response to selecting a subset of graphical elements within a first graphical depiction (e.g., the subset of cells 610 in the performance landscape visualization 410 of FIG. 7), the processor re-arranges a plurality of additional graphical depictions (the aggregated image bars of the hierarchical parallel coordinate visualization 510 of FIG. 7). Particularly, the processor 802 recalculates a hierarchy of respective visual features associated with a plurality of additional graphical depictions and/or visualizations (e.g., by agglomerative hierarchical clustering, as discussed above) based only on the selected data corresponding to subset of graphical elements within a first graphical depiction (e.g., the subset of cells 610 of FIG. 7). The processor 802 operates the display screen 808 to display the graphical user interface with the plurality of graphical depictions and/or visualizations arranged according to recalculated hierarchy (e.g., as shown in FIG. 7).

Embodiments within the scope of the disclosure may also include non-transitory computer-readable storage media or machine-readable medium for carrying or having computer-executable instructions (also referred to as program instructions) or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for visualizing an operation of a neural network model, the method comprising:
    receiving, with a processor, a plurality of images;
    receiving, with the processor, a plurality of outputs, each output in the plurality of outputs having been outputted by the neural network model responsive to a corresponding image in the plurality of images;
    receiving, with the processor, a plurality of sets of visual features, each set of visual features having been extracted from a corresponding image in the plurality of images;
    sorting, with the processor, the plurality of images into a plurality of bins based on a first visual feature and a second visual feature in the corresponding sets of visual features from the plurality of sets of visual features, each bin of the plurality of bins including images from the plurality of images having (i) a value for the first visual feature that is within a respective range of values for the first visual feature and (ii) a value for the second visual feature that is within a respective range of values for the second visual feature;
    generating, with the processor, a first graphical depiction of the plurality of outputs, the first graphical depiction including a first plurality of graphical elements encoding the plurality of outputs which are visually arranged in a grid formation having a first axis and a second axis, each graphical element in the plurality of graphical elements encoding outputs in the plurality of outputs corresponding to images in the plurality of images that are sorted into a corresponding bin of the plurality of bins, the first plurality of graphical elements being arranged along the first axis depending on the respective ranges of values for the first visual feature defined by the corresponding bins of the plurality of bins, the first plurality of graphical elements being arranged along the second axis depending on the respective ranges of values for the second visual feature defined by the corresponding bins of the plurality of bins;
    generating, with the processor, a second graphical depiction of the plurality of outputs, the second graphical depiction including a second plurality of graphical elements encoding the plurality of outputs which are visually arranged in a row formation along the first axis, each graphical element in the second plurality of graphical elements encoding outputs in the plurality of outputs corresponding to images in the plurality of images that are sorted into a respective subset of bins of the plurality of bins corresponding to a respective range of values for the first visual feature, the second plurality of graphical elements being arranged along the first axis depending on the respective ranges of values for the first visual feature defined by the respective subset of bins;
    generating, with the processor, a third graphical depiction of the plurality of outputs, the third graphical depiction including a third plurality of graphical elements encoding the plurality of outputs which are visually arranged in a column formation along the second axis, each graphical element in the third plurality of graphical elements encoding outputs in the plurality of outputs corresponding to images in the plurality of images that are sorted into a respective subset of bins of the plurality of bins corresponding to a respective range of values for the second visual feature, the third plurality of graphical elements being arranged along the second axis depending on the respective ranges of values for the second visual feature defined by the respective subset of bins; and
    displaying, on a display screen, a graphical user interface including the first graphical depiction of the plurality of outputs, the second graphical depiction of the plurality of outputs, and the third graphical depiction of the plurality of outputs.

2. The method of claim 1 further comprising:
    receiving, via a user interface, a user input; and
    adjusting, with the processor, based on the user input, the first graphical depiction to arrange the first plurality of graphical elements in a different manner according to the plurality of sets of visual features.

3. The method of claim 1, the receiving the plurality of outputs further comprising:
    determining, with the processor, each output in the plurality of outputs based on the corresponding image in the plurality of images using the neural network model.

4. The method of claim 1, wherein each output in the plurality of outputs is a classification of at least one of (i) a presence of a particular object in the corresponding image in the plurality of images and (ii) a state of the particular object in the corresponding image in the plurality of images.

5. The method of claim 1, the receiving the plurality of sets of visual features further comprising:
    determining, with the processor, each set of visual features in the plurality of sets of visual features based on the corresponding image in the plurality of images.

6. The method of claim 1, the generating the first graphical depiction further comprising:
    generating, with the processor, the first graphical depiction with some of the graphical elements in the plurality graphical elements being thumbnails of representative images of the plurality of images that are sorted into the corresponding bins of the plurality of bins.

7. The method of claim 1, the generating the first graphical depiction further comprising:
generating, with the processor, the first graphical depiction with some of the graphical element in the plurality graphical elements encoding a performance metric of the neural network model with respect to images of the plurality of images that are sorted into the corresponding bins of the plurality of bins.

8. The method of claim 7, wherein at least one of:
a color of some of graphical elements in the plurality graphical elements encodes the performance metric; and
at least one of a (i) size and (ii) shape of some of graphical elements in the plurality graphical elements encodes a total number of images sorted into the corresponding bins of the plurality of bins.

9. The method of claim 1 further comprising:
receiving, via a user interface, a user input selecting at least one of the first visual feature or the second visual feature in the corresponding sets of visual features, based on which the plurality of images are sorted into the plurality of bins.

10. The method of claim 1 further comprising:
receiving, via a user interface, a user input selecting a subset of the first plurality of graphical elements; and
adjusting, with the processor, at least one of the second graphical depiction and the third graphical depiction depending on the selected subset of the first plurality of graphical elements.

11. The method of claim 10, the adjusting the at least one of the second graphical depiction and the third graphical depiction further comprising at least one of:
adjusting, with the processor, the second graphical depiction to highlight a subset of the second plurality of graphical elements corresponding to bins in the plurality of bins defining ranges of values for the first visual feature and the second visual feature that correlate to the ranges of values for the first visual feature and the second visual feature defined by the bins in the plurality of bins that correspond to the selected subset of the first plurality of graphical elements; and
adjusting, with the processor, the third graphical depiction to highlight a subset of the third plurality of graphical elements corresponding to bins in the plurality of bins defining ranges of values for the first visual feature and the second visual feature that correlate to the ranges of values for the first visual feature and the second visual feature defined by the bins in the plurality of bins that correspond to the selected subset of the first plurality of graphical elements.

12. The method of claim 1 further comprising:
generating, with the processor, a plurality of fourth graphical depictions, each respective fourth graphical depiction in the plurality of graphical depictions corresponding to respective visual feature of the sets of visual features, each respective fourth graphical depiction in the plurality of graphical depictions having a respective fourth plurality of graphical elements, each graphical element in the respective fourth plurality graphical elements encoding outputs in the plurality of outputs corresponding to images in the plurality of images that are sorted into a corresponding bin of the plurality of bins, the corresponding bins of the respective fourth plurality graphical elements each defining a range of values for the respective visual feature;
determining, with the processor, a hierarchy of the respective visual features corresponding to plurality of fourth graphical depictions; and
displaying, on the display screen, the graphical user interface with the plurality of graphical depictions arranged according to determined hierarchy.

13. The method of claim 12 further comprising:
generating, with the processor, a fifth graphical depiction including a fifth plurality of graphical elements, each graphical element in the fifth plurality graphical elements corresponding to a respective bin of the plurality of bins;
receiving, via a user interface, a user input selecting a subset of the fifth further plurality of graphical elements; and
determining, with the processor, the hierarchy based on the selected subset of the fifth further plurality of graphical elements.

14. A system for visualizing an operation of a neural network model, the system comprising:
a display screen;
a memory configured to store (i) a plurality of images, (ii) a plurality of outputs, each output in the plurality of outputs having been outputted by the neural network model responsive to a corresponding image in the plurality of images, and (iii) a plurality of sets of visual features, each set of visual features having been extracted from a corresponding image in the plurality of images; and
a processor operably connected to the display screen and the memory, the processor being configured to:
read, from the memory, (i) the plurality of images, (ii) the plurality of outputs, and (iii) the plurality of sets of visual features;
sort the plurality of images into a plurality of bins based on a first visual feature and a second visual feature in the corresponding sets of visual features from the plurality of sets of visual features, each bin of the plurality of bins including images from the plurality of images having (i) a value for the first visual feature that is within a respective range of values for the first visual feature and (ii) a value for the second visual feature that is within a respective range of values for the second visual feature;
generate, and operate the display screen to display, a graphical user interface including a first graphical depiction of the plurality of outputs, a second graphical depiction of the plurality of outputs, and a third graphical depiction of the plurality of outputs,
wherein the first graphical depiction includes a first plurality of graphical elements encoding the plurality of outputs which are visually arranged in a grid formation having a first axis and a second axis, each graphical element in the plurality of graphical elements encoding outputs in the plurality of outputs corresponding to images in the plurality of images that are sorted into a corresponding bin of the plurality of bins, the first plurality of graphical elements being arranged along the first axis depending on the respective ranges of values for the first visual feature defined by the corresponding bins of the plurality of bins, the first plurality of graphical elements being arranged along the second axis depending on the respective ranges of values for the second visual feature defined by the corresponding bins of the plurality of bins, wherein the second graphical depiction includes a second plurality of graphical elements encoding the plurality of outputs which are visually arranged in a row formation along the first axis, each graphical element in the second plurality of graphical elements encoding outputs in the plurality of outputs corresponding to images in the plurality of images that are sorted into a respective subset of bins of the plurality of bins corresponding to a respective range of values for the first visual feature, the second plurality of graphical elements being arranged along the first axis depending on the respective ranges of values for the first visual feature defined by the respective subset of bins, and wherein the third graphical depiction includes a third plurality of graphical elements encoding the plurality of outputs which are visually arranged in a column formation along the second axis, each graphical element in the third plurality of graphical elements encoding outputs in the plurality of outputs corresponding to images in the plurality of images that are sorted into a respective subset of bins of the plurality of bins corresponding to a respective range of values for the second visual feature, the third plurality of graphical elements being arranged along the second axis depending on the respective ranges of values for the second visual feature defined by the respective subset of bins.

15. A non-transitory computer-readable medium for visualizing an operation of a neural network model, the computer-readable medium storing program instructions that, when executed by a processor, cause the processor to:

receive a plurality of images;

receive a plurality of outputs, each output in the plurality of outputs having been outputted by the neural network model responsive to a corresponding image in the plurality of images;

receive a plurality of sets of visual features, each set of visual features having been extracted from a corresponding image in the plurality of images;

sort the plurality of images into a plurality of bins based on a first visual feature and a second visual feature in the corresponding sets of visual features from the plurality of sets of visual features, each bin of the plurality of bins including images from the plurality of images having (i) a value for the first visual feature that is within a respective range of values for the first visual feature and (ii) a value for the second visual feature that is within a respective range of values for the second visual feature;

generate, and operate the display screen to display, a graphical user interface including a first graphical depiction of the plurality of outputs, a second graphical depiction of the plurality of outputs, and a third graphical depiction of the plurality of outputs, wherein the first graphical depiction includes a first plurality of graphical elements encoding the plurality of outputs which are visually arranged in a grid formation having a first axis and a second axis, each graphical element in the plurality of graphical elements encoding outputs in the plurality of outputs corresponding to images in the plurality of images that are sorted into a corresponding bin of the plurality of bins, the first plurality of graphical elements being arranged along the first axis depending on the respective ranges of values for the first visual feature defined by the corresponding bins of the plurality of bins, the first plurality of graphical elements being arranged along the second axis depending on the respective ranges of values for the second visual feature defined by the corresponding bins of the plurality of bins, wherein the second graphical depiction includes a second plurality of graphical elements encoding the plurality of outputs which are visually arranged in a row formation along the first axis, each graphical element in the second plurality of graphical elements encoding outputs in the plurality of outputs corresponding to images in the plurality of images that are sorted into a respective subset of bins of the plurality of bins corresponding to a respective range of values for the first visual feature, the second plurality of graphical elements being arranged along the first axis depending on the respective ranges of values for the first visual feature defined by the respective subset of bins, and wherein the third graphical depiction includes a third plurality of graphical elements encoding the plurality of outputs which are visually arranged in a column formation along the second axis, each graphical element in the third plurality of graphical elements encoding outputs in the plurality of outputs corresponding to images in the plurality of images that are sorted into a respective subset of bins of the plurality of bins corresponding to a respective range of values for the second visual feature, the third plurality of graphical elements being arranged along the second axis depending on the respective ranges of values for the second visual feature defined by the respective subset of bins.

* * * * *